(12) United States Patent
Lung et al.

(10) Patent No.: US 8,468,149 B1
(45) Date of Patent: Jun. 18, 2013

(54) MULTI-LINGUAL ONLINE COMMUNITY

(75) Inventors: Felix Lung, Los Angeles, CA (US); William Wong, Huntington Beach, CA (US); Daniel Marcu, Hermosa Beach, CA (US)

(73) Assignee: Language Weaver, Inc., Los Angeles, CA (US)

( * ) Notice: Subject to any disclaimer, the term of this patent is extended or adjusted under 35 U.S.C. 154(b) by 542 days.

(21) Appl. No.: 11/698,501

(22) Filed: Jan. 26, 2007

(51) Int. Cl.
*G06F 17/30* (2006.01)

(52) U.S. Cl.
CPC .............................. *G06F 17/30017* (2013.01)
USPC .......................................... 707/713; 707/769

(58) Field of Classification Search
USPC ............. 707/2, 758, 759, 760, 769, 770, 781, 707/783, 784; 704/2, 7, 8, 9, 277
See application file for complete search history.

(56) References Cited

U.S. PATENT DOCUMENTS

| | | | |
|---|---|---|---|
| 4,502,128 A | 2/1985 | Okajima et al. | |
| 4,599,691 A | 7/1986 | Sakaki et al. | |
| 4,615,002 A * | 9/1986 | Innes | 704/8 |
| 4,661,924 A | 4/1987 | Okamoto et al. | |
| 4,787,038 A | 11/1988 | Doi et al. | |
| 4,791,587 A | 12/1988 | Doi | |
| 4,800,522 A | 1/1989 | Miyao et al. | |
| 4,814,987 A | 3/1989 | Miyao et al. | |
| 4,942,526 A | 7/1990 | Okajima et al. | |
| 4,980,829 A | 12/1990 | Okajima et al. | |
| 5,020,112 A | 5/1991 | Chou | |
| 5,088,038 A | 2/1992 | Tanaka et al. | |
| 5,091,876 A | 2/1992 | Kumano et al. | |
| 5,146,405 A | 9/1992 | Church | |
| 5,167,504 A | 12/1992 | Mann | |
| 5,181,163 A | 1/1993 | Nakajima et al. | |
| 5,212,730 A | 5/1993 | Wheatley et al. | |
| 5,218,537 A | 6/1993 | Hemphill et al. | |
| 5,220,503 A | 6/1993 | Suzuki et al. | |
| 5,267,156 A | 11/1993 | Nomiyama | |
| 5,268,839 A * | 12/1993 | Kaji | 704/3 |
| 5,295,068 A * | 3/1994 | Nishino et al. | 704/10 |

(Continued)

FOREIGN PATENT DOCUMENTS

| | | |
|---|---|---|
| EP | 0469884 A2 | 2/1992 |
| EP | 0715265 A2 | 6/1996 |

(Continued)

OTHER PUBLICATIONS

Nagao, Katashi, et al., "Semantic Annotation and Transcoding: Making Web Content More Accessible", IEEE Multimedia, vol. 8, Issue 2 Apr.-Jun. 2001, pp. 69-81.*

(Continued)

*Primary Examiner* — Jean B Fleurantin
(74) *Attorney, Agent, or Firm* — Carr & Ferrell LLP (57) ABSTRACT

A method, system and computer readable medium for hosting a community in multiple languages is disclosed. The method comprises receiving a request from a first member of a community to post content within the community. The content is written in a first language. Next, the content is translated into a second language. Login information is received from a second member. The second member may be associated with a second language. Lastly, the translated content is displayed to the second member. The method may further comprise receiving feedback from the second member relating to the quality of the translation or post edited versions of the automatically produced translation.

25 Claims, 6 Drawing Sheets

U.S. PATENT DOCUMENTS

| | | | |
|---|---|---|---|
| 5,311,429 | A | 5/1994 | Tominaga |
| 5,387,104 | A | 2/1995 | Corder |
| 5,432,948 | A | 7/1995 | Davis et al. |
| 5,442,546 | A | 8/1995 | Kaji et al. |
| 5,477,450 | A | 12/1995 | Takeda et al. |
| 5,477,451 | A | 12/1995 | Brown et al. |
| 5,495,413 | A | 2/1996 | Kutsumi et al. |
| 5,497,319 | A | 3/1996 | Chong et al. |
| 5,510,981 | A | 4/1996 | Berger et al. |
| 5,528,491 | A | 6/1996 | Kuno et al. |
| 5,535,120 | A | 7/1996 | Chong et al. |
| 5,541,836 | A | 7/1996 | Church et al. |
| 5,541,837 | A * | 7/1996 | Fushimoto ............ 704/2 |
| 5,548,508 | A | 8/1996 | Nagami |
| 5,644,774 | A | 7/1997 | Fukumochi et al. |
| 5,675,815 | A | 10/1997 | Yamauchi et al. |
| 5,687,383 | A | 11/1997 | Nakayama et al. |
| 5,696,980 | A | 12/1997 | Brew |
| 5,724,593 | A | 3/1998 | Hargrave, III et al. |
| 5,752,052 | A | 5/1998 | Richardson et al. |
| 5,754,972 | A | 5/1998 | Baker et al. |
| 5,761,631 | A | 6/1998 | Nasukawa |
| 5,761,689 | A | 6/1998 | Rayson et al. |
| 5,768,603 | A | 6/1998 | Brown et al. |
| 5,779,486 | A | 7/1998 | Ho et al. |
| 5,781,884 | A | 7/1998 | Pereira et al. |
| 5,794,178 | A | 8/1998 | Caid et al. |
| 5,805,832 | A | 9/1998 | Brown et al. |
| 5,806,032 | A | 9/1998 | Sproat |
| 5,819,265 | A | 10/1998 | Ravin et al. |
| 5,826,219 | A | 10/1998 | Kutsumi |
| 5,826,220 | A | 10/1998 | Takeda et al. |
| 5,845,143 | A | 12/1998 | Yamauchi et al. |
| 5,848,385 | A | 12/1998 | Poznanski et al. |
| 5,848,386 | A | 12/1998 | Motoyama |
| 5,855,015 | A * | 12/1998 | Shoham ............ 715/205 |
| 5,864,788 | A | 1/1999 | Kutsumi |
| 5,867,811 | A | 2/1999 | O'Donoghue |
| 5,870,706 | A | 2/1999 | Alshawi |
| 5,893,134 | A | 4/1999 | O'Donoghue et al. |
| 5,903,858 | A | 5/1999 | Saraki |
| 5,907,821 | A | 5/1999 | Kaji et al. |
| 5,909,681 | A | 6/1999 | Passera et al. |
| 5,966,685 | A * | 10/1999 | Flanagan et al. ............ 704/8 |
| 5,983,169 | A | 11/1999 | Kozma |
| 5,987,402 | A * | 11/1999 | Murata et al. ............ 704/2 |
| 5,987,404 | A | 11/1999 | Della Pietra et al. |
| 5,991,710 | A | 11/1999 | Papineni et al. |
| 5,995,922 | A | 11/1999 | Penteroudakis et al. |
| 6,018,617 | A | 1/2000 | Sweitzer et al. |
| 6,031,984 | A | 2/2000 | Walser |
| 6,032,111 | A | 2/2000 | Mohri |
| 6,047,252 | A * | 4/2000 | Kumano et al. ............ 704/2 |
| 6,064,819 | A | 5/2000 | Franssen et al. |
| 6,064,951 | A | 5/2000 | Park et al. |
| 6,073,143 | A * | 6/2000 | Nishikawa et al. ........ 715/207 |
| 6,077,085 | A | 6/2000 | Parry et al. |
| 6,092,034 | A | 7/2000 | McCarley et al. |
| 6,119,077 | A | 9/2000 | Shinozaki |
| 6,131,082 | A | 10/2000 | Hargrave, III et al. |
| 6,161,082 | A * | 12/2000 | Goldberg et al. ............ 704/3 |
| 6,182,014 | B1 | 1/2001 | Kenyon et al. |
| 6,182,027 | B1 | 1/2001 | Nasukawa et al. |
| 6,205,456 | B1 | 3/2001 | Nakao |
| 6,223,150 | B1 | 4/2001 | Duan et al. |
| 6,233,544 | B1 | 5/2001 | Alshawi |
| 6,233,545 | B1 | 5/2001 | Datig |
| 6,233,546 | B1 | 5/2001 | Datig |
| 6,236,958 | B1 | 5/2001 | Lange et al. |
| 6,269,351 | B1 | 7/2001 | Black |
| 6,275,789 | B1 * | 8/2001 | Moser et al. ............ 704/7 |
| 6,278,967 | B1 | 8/2001 | Akers et al. |
| 6,278,969 | B1 | 8/2001 | King et al. |
| 6,285,978 | B1 | 9/2001 | Bernth et al. |
| 6,289,302 | B1 | 9/2001 | Kuo |
| 6,304,841 | B1 | 10/2001 | Berger et al. |
| 6,311,152 | B1 | 10/2001 | Bai et al. |
| 6,317,708 | B1 | 11/2001 | Witbrock et al. |
| 6,327,568 | B1 | 12/2001 | Joost |
| 6,330,529 | B1 * | 12/2001 | Ito ............ 704/3 |
| 6,330,530 | B1 | 12/2001 | Horiguchi et al. |
| 6,356,864 | B1 | 3/2002 | Foltz et al. |
| 6,360,196 | B1 | 3/2002 | Poznanski et al. |
| 6,389,387 | B1 | 5/2002 | Poznanski et al. |
| 6,393,388 | B1 | 5/2002 | Franz et al. |
| 6,393,389 | B1 | 5/2002 | Chanod et al. |
| 6,415,250 | B1 | 7/2002 | van den Akker |
| 6,460,015 | B1 | 10/2002 | Hetherington et al. |
| 6,470,306 | B1 | 10/2002 | Pringle et al. |
| 6,473,729 | B1 | 10/2002 | Gastaldo et al. |
| 6,480,698 | B2 | 11/2002 | Ho et al. |
| 6,490,549 | B1 | 12/2002 | Ulicny et al. |
| 6,498,921 | B1 | 12/2002 | Ho et al. |
| 6,502,064 | B1 | 12/2002 | Miyahira et al. |
| 6,529,865 | B1 | 3/2003 | Duan et al. |
| 6,535,842 | B1 | 3/2003 | Roche et al. |
| 6,587,844 | B1 | 7/2003 | Mohri |
| 6,647,364 | B1 * | 11/2003 | Yumura et al. ............ 704/4 |
| 6,691,279 | B2 * | 2/2004 | Yoden et al. ............ 715/205 |
| 6,745,161 | B1 | 6/2004 | Arnold et al. |
| 6,757,646 | B2 | 6/2004 | Marchisio |
| 6,778,949 | B2 | 8/2004 | Duan et al. |
| 6,782,356 | B1 | 8/2004 | Lopke |
| 6,810,374 | B2 | 10/2004 | Kang |
| 6,848,080 | B1 | 1/2005 | Lee et al. |
| 6,857,022 | B1 | 2/2005 | Scanlan |
| 6,885,985 | B2 | 4/2005 | Hull |
| 6,901,361 | B1 | 5/2005 | Portilla |
| 6,904,402 | B1 | 6/2005 | Wang et al. |
| 6,952,665 | B1 | 10/2005 | Shimomura et al. |
| 6,983,239 | B1 | 1/2006 | Epstein |
| 6,996,520 | B2 | 2/2006 | Levin |
| 6,999,925 | B2 | 2/2006 | Fischer et al. |
| 7,013,262 | B2 | 3/2006 | Tokuda et al. |
| 7,016,827 | B1 | 3/2006 | Ramaswamy et al. |
| 7,016,977 | B1 * | 3/2006 | Dunsmoir et al. ............ 709/246 |
| 7,024,351 | B2 | 4/2006 | Wang |
| 7,031,911 | B2 | 4/2006 | Zhou et al. |
| 7,050,964 | B2 | 5/2006 | Menzes et al. |
| 7,085,708 | B2 | 8/2006 | Manson |
| 7,103,531 | B2 | 9/2006 | Moore |
| 7,107,204 | B1 | 9/2006 | Liu et al. |
| 7,107,215 | B2 | 9/2006 | Ghali |
| 7,113,903 | B1 | 9/2006 | Riccardi et al. |
| 7,143,036 | B2 | 11/2006 | Weise |
| 7,146,358 | B1 | 12/2006 | Gravano et al. |
| 7,149,688 | B2 | 12/2006 | Schalkwyk |
| 7,174,289 | B2 * | 2/2007 | Sukehiro ............ 704/7 |
| 7,177,792 | B2 | 2/2007 | Knight et al. |
| 7,191,115 | B2 | 3/2007 | Moore |
| 7,197,451 | B1 | 3/2007 | Carter et al. |
| 7,206,736 | B2 | 4/2007 | Moore |
| 7,209,875 | B2 | 4/2007 | Quirk et al. |
| 7,219,051 | B2 | 5/2007 | Moore |
| 7,239,998 | B2 | 7/2007 | Xun |
| 7,249,012 | B2 | 7/2007 | Moore |
| 7,249,013 | B2 | 7/2007 | Al-Onaizan et al. |
| 7,283,950 | B2 * | 10/2007 | Pournasseh et al. ............ 704/8 |
| 7,295,962 | B2 | 11/2007 | Marcu |
| 7,302,392 | B1 | 11/2007 | Thenthiruperai et al. |
| 7,319,949 | B2 | 1/2008 | Pinkham |
| 7,340,388 | B2 | 3/2008 | Soricut et al. |
| 7,346,487 | B2 | 3/2008 | Li |
| 7,346,493 | B2 | 3/2008 | Ringger et al. |
| 7,349,839 | B2 | 3/2008 | Moore |
| 7,356,457 | B2 | 4/2008 | Pinkham et al. |
| 7,373,291 | B2 | 5/2008 | Garst |
| 7,383,542 | B2 | 6/2008 | Richardson et al. |
| 7,389,222 | B1 | 6/2008 | Langmead et al. |
| 7,389,234 | B2 | 6/2008 | Schmid et al. |
| 7,409,332 | B2 | 8/2008 | Moore |
| 7,447,623 | B2 | 11/2008 | Appleby |
| 7,454,326 | B2 | 11/2008 | Marcu et al. |
| 7,496,497 | B2 | 2/2009 | Liu |
| 7,533,013 | B2 | 5/2009 | Marcu |
| 7,536,295 | B2 | 5/2009 | Cancedda et al. |
| 7,546,235 | B2 | 6/2009 | Brockett et al. |

| | | | |
|---|---|---|---|
| 7,565,281 B2 | 7/2009 | Appleby | |
| 7,574,347 B2 | 8/2009 | Wang | |
| 7,580,830 B2 | 8/2009 | Al-Onaizan et al. | |
| 7,620,538 B2 | 11/2009 | Marcu et al. | |
| 7,624,005 B2 | 11/2009 | Koehn et al. | |
| 7,624,020 B2 | 11/2009 | Yamada et al. | |
| 7,680,646 B2 | 3/2010 | Lux-Pogodalla et al. | |
| 7,689,405 B2 | 3/2010 | Marcu | |
| 7,698,125 B2 | 4/2010 | Graehl et al. | |
| 7,707,025 B2 | 4/2010 | Whitelock | |
| 7,711,545 B2 | 5/2010 | Koehn | |
| 7,716,037 B2 | 5/2010 | Precoda et al. | |
| 7,813,918 B2 | 10/2010 | Muslea et al. | |
| 7,974,833 B2 | 7/2011 | Soricut et al. | |
| 8,244,519 B2 | 8/2012 | Bicici et al. | |
| 8,415,472 B2 | 4/2013 | Chung et al. | |
| 2001/0009009 A1 | 7/2001 | Iizuka | |
| 2001/0029455 A1* | 10/2001 | Chin et al. | 704/277 |
| 2002/0002451 A1* | 1/2002 | Sukehiro | 704/3 |
| 2002/0013693 A1 | 1/2002 | Fuji | |
| 2002/0040292 A1 | 4/2002 | Marcu | |
| 2002/0046018 A1 | 4/2002 | Marcu et al. | |
| 2002/0046262 A1* | 4/2002 | Heilig et al. | 709/219 |
| 2002/0078091 A1 | 6/2002 | Vu et al. | |
| 2002/0099744 A1 | 7/2002 | Coden et al. | |
| 2002/0111788 A1* | 8/2002 | Kimpara | 704/2 |
| 2002/0111789 A1 | 8/2002 | Hull | |
| 2002/0152063 A1 | 10/2002 | Tokieda et al. | |
| 2002/0169592 A1 | 11/2002 | Aityan | |
| 2002/0188438 A1 | 12/2002 | Knight et al. | |
| 2002/0188439 A1 | 12/2002 | Marcu | |
| 2002/0198699 A1* | 12/2002 | Greene et al. | 704/2 |
| 2002/0198701 A1 | 12/2002 | Moore | |
| 2002/0198713 A1 | 12/2002 | Franz et al. | |
| 2003/0009322 A1 | 1/2003 | Marcu | |
| 2003/0023423 A1 | 1/2003 | Yamada et al. | |
| 2003/0144832 A1 | 7/2003 | Harris | |
| 2003/0158723 A1 | 8/2003 | Masuichi et al. | |
| 2003/0176995 A1 | 9/2003 | Sukehiro | |
| 2003/0182102 A1 | 9/2003 | Corston-Oliver et al. | |
| 2003/0191626 A1 | 10/2003 | Al-Onaizan et al. | |
| 2003/0204400 A1 | 10/2003 | Marcu et al. | |
| 2003/0217052 A1 | 11/2003 | Rubenczyk et al. | |
| 2003/0233222 A1 | 12/2003 | Soricut et al. | |
| 2004/0015342 A1 | 1/2004 | Garst | |
| 2004/0024581 A1 | 2/2004 | Koehn et al. | |
| 2004/0030551 A1 | 2/2004 | Marcu et al. | |
| 2004/0059708 A1 | 3/2004 | Dean et al. | |
| 2004/0068411 A1 | 4/2004 | Scanlan | |
| 2004/0098247 A1 | 5/2004 | Moore | |
| 2004/0111253 A1 | 6/2004 | Luo et al. | |
| 2004/0122656 A1 | 6/2004 | Abir | |
| 2004/0167768 A1 | 8/2004 | Travieso et al. | |
| 2004/0167784 A1* | 8/2004 | Travieso et al. | 704/270.1 |
| 2004/0193401 A1 | 9/2004 | Ringger et al. | |
| 2004/0230418 A1 | 11/2004 | Kitamura | |
| 2004/0237044 A1* | 11/2004 | Travieso et al. | 715/530 |
| 2005/0021322 A1 | 1/2005 | Richardson et al. | |
| 2005/0021517 A1 | 1/2005 | Marchisio | |
| 2005/0026131 A1* | 2/2005 | Elzinga et al. | 434/365 |
| 2005/0033565 A1 | 2/2005 | Koehn | |
| 2005/0038643 A1 | 2/2005 | Koehn | |
| 2005/0060160 A1 | 3/2005 | Roh et al. | |
| 2005/0075858 A1* | 4/2005 | Pournasseh et al. | 704/2 |
| 2005/0102130 A1 | 5/2005 | Quirk et al. | |
| 2005/0125218 A1 | 6/2005 | Rajput et al. | |
| 2005/0149315 A1 | 7/2005 | Flanagan et al. | |
| 2005/0171757 A1 | 8/2005 | Appleby | |
| 2005/0204002 A1 | 9/2005 | Friend | |
| 2005/0228640 A1 | 10/2005 | Aue et al. | |
| 2005/0228642 A1 | 10/2005 | Mau et al. | |
| 2005/0228643 A1 | 10/2005 | Munteanu et al. | |
| 2005/0234701 A1 | 10/2005 | Graehl et al. | |
| 2006/0015320 A1 | 1/2006 | Och | |
| 2006/0015323 A1 | 1/2006 | Udupa et al. | |
| 2006/0018541 A1 | 1/2006 | Chelba et al. | |
| 2006/0020448 A1 | 1/2006 | Chelba et al. | |
| 2006/0095248 A1 | 5/2006 | Menezes et al. | |
| 2006/0111891 A1 | 5/2006 | Menezes et al. | |
| 2006/0111892 A1 | 5/2006 | Menezes et al. | |
| 2006/0111896 A1 | 5/2006 | Menezes et al. | |
| 2006/0129424 A1 | 6/2006 | Chan | |
| 2006/0142995 A1 | 6/2006 | Knight et al. | |
| 2006/0150069 A1 | 7/2006 | Chang | |
| 2006/0190241 A1 | 8/2006 | Goutte et al. | |
| 2007/0016400 A1 | 1/2007 | Soricutt et al. | |
| 2007/0016401 A1 | 1/2007 | Ehsani et al. | |
| 2007/0033001 A1 | 2/2007 | Muslea et al. | |
| 2007/0050182 A1 | 3/2007 | Sneddon et al. | |
| 2007/0078654 A1 | 4/2007 | Moore | |
| 2007/0094169 A1 | 4/2007 | Yamada et al. | |
| 2007/0112553 A1* | 5/2007 | Jacobson | 704/2 |
| 2007/0112555 A1 | 5/2007 | Lavi et al. | |
| 2007/0112556 A1 | 5/2007 | Lavi et al. | |
| 2007/0122792 A1 | 5/2007 | Galley et al. | |
| 2007/0168450 A1* | 7/2007 | Prajapat et al. | 709/207 |
| 2007/0180373 A1* | 8/2007 | Bauman et al. | 715/535 |
| 2007/0219774 A1 | 9/2007 | Quirk et al. | |
| 2007/0250306 A1 | 10/2007 | Marcu et al. | |
| 2007/0269775 A1* | 11/2007 | Andreev et al. | 434/156 |
| 2007/0294076 A1 | 12/2007 | Shore et al. | |
| 2008/0052061 A1 | 2/2008 | Kim et al. | |
| 2008/0065478 A1 | 3/2008 | Kohlmeier et al. | |
| 2008/0114583 A1 | 5/2008 | Al-Onaizan et al. | |
| 2008/0154581 A1 | 6/2008 | Lavi et al. | |
| 2008/0183555 A1 | 7/2008 | Walk | |
| 2008/0215418 A1 | 9/2008 | Kolve et al. | |
| 2008/0249760 A1 | 10/2008 | Marcu et al. | |
| 2008/0270109 A1 | 10/2008 | Och | |
| 2008/0270112 A1 | 10/2008 | Shimohata | |
| 2008/0281578 A1 | 11/2008 | Kumaran et al. | |
| 2008/0307481 A1 | 12/2008 | Panje | |
| 2009/0076792 A1 | 3/2009 | Lawson-Tancred | |
| 2009/0083023 A1 | 3/2009 | Foster et al. | |
| 2009/0119091 A1 | 5/2009 | Sarig | |
| 2009/0326912 A1 | 12/2009 | Ueffing | |
| 2010/0017293 A1 | 1/2010 | Lung et al. | |
| 2010/0042398 A1 | 2/2010 | Marcu et al. | |
| 2010/0174524 A1 | 7/2010 | Koehn | |
| 2011/0029300 A1 | 2/2011 | Marcu et al. | |
| 2011/0082684 A1 | 4/2011 | Soricut et al. | |

FOREIGN PATENT DOCUMENTS

| | | | |
|---|---|---|---|
| EP | 0933712 A2 | | 8/1999 |
| EP | 0933712 A3 | | 1/2001 |
| JP | 07244666 | | 9/1995 |
| JP | 10011447 | | 1/1998 |
| JP | 11272672 | | 10/1999 |

OTHER PUBLICATIONS

Berhe, Girma, et al., "Modeling service-Based Multimedia Content Adaptation in Pervasive Computing", CF '04, Ischia, Italy, Apr. 14-16, 2004, pp. 60-69.*

Boitet, Christian, et al., "Main Research Issues in Building Web Services", Proc. of the 6th Symposium on Natural language Processing, Human and Computer Processing of Language and Speech, © 2005, pp. 1-11.*

Llitjós, Ariadna Font, et al., "The Translation Correction Tool: English-Spanish User Studies", Citeseer, © 2004, downloaded from: http://gs37.sp.cs.cmu.edu/ari/papers/lrec04/fontll, pp. 1-4.*

Ballesteros, Lisa, et al., "Phrasal Translation and Query Expansion Techniques for Cross-Language Information", SIGIR 97, Philadelphia, PA, © 1997, pp. 84-91.*

Metze, F., et al., "The Nespole! Speech-to-Speech Translation System", Proc. of the HLT 2002, 2nd Int'l Conf. on Human language Technology, San Francisco, CA, © 2002, pp. 378-383.*

McDevitt, Kathleen, et al., "Designing of a Community-Based Translation Center", Technical Report TR-03-30, Computer Science, Virginia Tech, © 2003, pp. 1-8.*

Fleming, Michael, et al., "Mixed-Initiative Translation of Web Pages", AMTA 2000, LNAI 1934, Springer-Verlag, Berlin, Germany, © 2000, pp. 25-29.*

Perugini, Saverio, et al., "Enhancing Usability in CITIDEL: Multimodal, Multilingual and Interactive Visualization Interfaces", JCDL '04, Tucson, AZ, Jun. 7-11, 2004, pp. 315-324.*

Kishore Papineni et al, BLEU: a Method for Automatic Evaluation of Machine Translation, Jul. 2002, Google, 311-318.*
Abney, Steven P., "Parsing by Chunks," 1991, Principle-Based Parsing: Computation and Psycholinguistics, vol. 44,pp. 257-279.
Agbago, A., et al., "True-casing for the Portage System," In Recent Advances in Natural Language Processing (Borovets, Bulgaria), Sep. 21-23, 2005, pp. 21-24.
Al-Onaizan et al., "Statistical Machine Translation," 1999, JHU Summer Tech Workshop, Final Report, pp. 1-42.
Al-Onaizan et al., "Translating with Scarce Resources," 2000, 17th National Conference of the American Association for Artificial Intelligence, Austin, TX, pp. 672-678.
Al-Onaizan, Y. and Knight K., "Machine Transliteration of Names in Arabic Text,"Proceedings of ACL Workshop on Computational Approaches to Semitic Languages. Philadelphia, 2002.
Al-Onaizan, Y. and Knight, K., "Named Entity Translation: Extended Abstract", 2002, Proceedings of HLT-02, San Diego, CA.
Al-Onaizan, Y. and Knight, K., "Translating Named Entities Using Monolingual and Bilingual Resources," 2002, Proc. of the 40th Annual Meeting of the ACL, pp. 400-408.
Alshawi et al., "Learning Dependency Translation Models as Collections of Finite-State Head Transducers," 2000, Computational Linguistics, vol. 26, pp. 45-60.
Alshawi, Hiyan, "Head Automata for Speech Translation", Proceedings of the ICSLP 96, 1996, Philadelphia, Pennslyvania.
Ambati, V., "Dependency Structure Trees in Syntax Based Machine Translation," Spring 2008 Report <http://www.cs.cmu.edu/~vamshi/publications/DependencyMT_report.pdf>, pp. 1-8.
Arbabi et al., "Algorithms for Arabic name transliteration," Mar. 1994, IBM Journal of Research and Development, vol. 38, Issue 2, pp. 183-194.
Arun, A., et al., "Edinburgh System Description for the 2006 TC-STAR Spoken Language Translation Evaluation," in TC-STAR Workshop on Speech-to-Speech Translation (Barcelona, Spain), Jun. 2006, pp. 37-41.
Bangalore, S. and Rambow, O., "Evaluation Metrics for Generation," 2000, Proc. of the 1st International Natural Language Generation Conf., vol. 14, pp. 1-8.
Bangalore, S. and Rambow, O., "Using TAGs, a Tree Model, and a Language Model for Generation," May 2000, Workshop TAG+5, Paris.
Bangalore, S. and Rambow, O., "Corpus-Based Lexical Choice in Natural Language Generation," 2000, Proc. of the 38th Annual ACL, Hong Kong, pp. 464-471.
Bangalore, S. and Rambow, O., "Exploiting a Probabilistic Hierarchical Model for Generation," 2000, Proc. of 18th conf. on Computational Linguistics, vol. 1, pp. 42-48.
Bannard, C. and Callison-Burch, C., "Paraphrasing with Bilingual Parallel Corpora," In Proceedings of the 43rd Annual Meeting on Association for Computational Linguistics (Ann Arbor, MI, Jun. 25-30, 2005). Annual Meeting of the ACL Assoc. for Computational Linguistics, Morristown, NJ, 597-604. DOI=http://dx.doi.org/10.3115/1219840.
Barnett et al., "Knowledge and Natural Language Processing," Aug. 1990, Communications of the ACM, vol. 33, Issue 8, pp. 50-71.
Baum, Leonard, "An Inequality and Associated Maximization Technique in Statistical Estimation for Probabilistic Functions of Markov Processes", 1972, Inequalities 3:1-8.
Brants, Thorsten, "TnT—A Statistical Part-of-Speech Tagger," 2000, Proc. of the 6th Applied Natural Language Processing Conference, Seattle.
Brill, Eric, "Transformation-Based Error-Driven Learning and Natural Language Processing: A Case Study in Part of Speech Tagging", 1995, Assocation for Computational Linguistics, vol. 21, No. 4, pp. 1-37.
Brill, Eric. "Transformation-Based Error-Driven Learning and Natural Language Processing: A Case Study in Part of Speech Tagging",1995, Computational Linguistics, vol. 21, No. 4, pp. 543-565.
Brown et al., "A Statistical Approach to Machine Translation," Jun. 1990, Computational Linguistics, vol. 16, No. 2, pp. 79-85.
Brown et al., "Word-Sense Disambiguation Using Statistical Methods," 1991, Proc. of 29th Annual ACL, pp. 264-270.
Brown et al., "The Mathematics of Statistical Machine Translation: Parameter D Estimation," 1993, Computational Linguistics, vol. 19, Issue 2, pp. 263-311.
Brown, Ralf, "Automated Dictionary Extraction for "Knowledge-Free" Example-Based Translation," 1997, Proc. of 7th Int'l Cont. on Theoretical and Methodological Issues in MT, Santa Fe, NM, pp. 111-118.
Callan et al., "TREC and TIPSTER Experiments with Inquery," 1994, Information Processing and Management, vol. 31, Issue 3, pp. 327-343.
Callison-Burch, C. et al., "Statistical Machine Translation with Word- and Sentence-aligned Parallel Corpora," In Proceedings of the 42nd Meeting on Assoc. for Computational Linguistics (Barcelona, Spain, Jul. 21-26, 2004). Annual Meeting of the ACL. Assoc. for Computational Linguistics, Morristown, NJ, 1.
Carl, Michael. "A Constructivist Approach to Machine Translation," 1998, New Methods of Language Processing and Computational Natural Language Learning, pp. 247-256.
Chen, K. and Chen, H., "Machine Translation: An Integrated Approach," 1995, Proc. of 6th Int'l Cont. on Theoretical and Methodological Issue in MT, pp. 287-294.
Cheng, P. et al., "Creating Multilingual Translation Lexicons with Regional Variations Using Web Corpora," In Proceedings of the 42nd Annual Meeting on Assoc. for Computational Linguistics (Barcelona, Spain, Jul. 21-26, 2004). Annual Meeting of the ACL. Assoc. for Computational Linguistics, Morristown, NJ, 53.
Cheung et al., "Sentence Alignment in Parallel, Comparable, and Quasi-comparable Corpora", In Proceedings of LREC, 2004, pp. 30-33.
Chinchor, Nancy, "MUC-7 Named Entity Task Definition," 1997, Version 3.5.
Clarkson, P. and Rosenfeld, R., "Statistical Language Modeling Using the CMU-Cambridge Toolkit", 1997, Proc. ESCA Eurospeech, Rhodes, Greece, pp. 2707-2710.
Cohen et al., "Spectral Bloom Filters," SIGMOD 2003, Jun. 9-12, 2003, ACM pp. 241-252.
Cohen, "Hardware-Assisted Algorithm for Full-text Large-dictionary String Matching Using n-gram Hashing," 1998, Information Processing and Management, vol. 34, No. 4, pp. 443-464.
Cohen, Yossi, "Interpreter for FUF," (available at ftp:/lftp.cs.bgu.ac.il/ pUb/people/elhadad/fuf-life.lf).
Corston-Oliver, Simon, "Beyond String Matching and Cue Phrases: Improving Efficiency and Coverage in Discourse Analysis", 1998, The AAAI Spring Symposium on Intelligent Text Summarization, pp. 9-15.
Covington, "An Algorithm to Align Words for Historical Comparison", Computational Linguistics, 1996, 22(4), pp. 481-496.
Dagan, I. and Itai, A., "Word Sense Disambiguation Using a Second Language Monolingual Corpus", 1994, Association for Computational Linguistics, vol. 20, No. 4, pp. 563-596.
Dempster et al., "Maximum Likelihood from Incomplete Data via the EM Algorithm", 1977, Journal of the Royal Statistical Society, vol. 39, No. 1, pp. 1-38.
Diab, M. and Finch, S., "A Statistical Word-Level Translation Model for Comparable Corpora," 2000, In Proc.of the Conference on Content Based Multimedia Information Access (RIAO).
Diab, Mona, "An Unsupervised Method for Multilingual Word Sense Tagging Using Parallel Corpora: A Preliminary Investigation", 2000, SIGLEX Workshop on Word Senses and Multi-Linguality, pp. 1-9.
Eisner, Jason,"Learning Non-Isomorphic Tree Mappings for Machine Translation," 2003, In Proc. of the 41st Meeting of the ACL, pp. 205-208.
Elhadad et al., "Floating Constraints in Lexical Choice", 1996, ACL, 23(2): 195-239.
Elhadad, M. and Robin, J., "An Overview of Surge: a Reusable Comprehensive Syntactic Realization Component," 1996, Technical Report 96-03, Department of Mathematics and Computer Science, Ben Gurion University, Beer Sheva, Israel.
Elhadad, M. and Robin, J., "Controlling Content Realization with Functional Unification Grammars", 1992, Aspects of Automated Natural Language Generation, Dale et al. (eds)., Springer Verlag, pp. 89-104.

Elhadad, Michael, "FUF: The Universal Unifier User Manual Version 5.2", 1993, Department of Computer Science, Ben Gurion University, Beer Sheva, Israel.

Elhadad, Michael, "Using Argumentation to Control Lexical Choice: A Functional Unification Implementation", 1992, Ph.D. Thesis, Graduate School of Arts and Sciences, Columbia University.

Elhadad. M., and Robin, J., "SURGE: a Comprehensive Plug-in Syntatic Realization Component for Text Generation", 1999 (available at http://www.cs.bug.ac.il/-elhadad/pub.html).

Franz Josef Och, Hermann Ney: "Improved Statistical Alignment Models" ACLOO: Proc. of the 38th Annual Meeting of the Association for Computational Linguistics, 'Online! Oct. 2-6, 2000, pp. 440-447, XP002279144 Hong Kong, China Retrieved from the Internet: <URL:http://www-i6.informatik.rwth-aachen.de/Colleagues/och/ACLOO.ps> ' retrieved on May 6, 2004! abstract.

Fuji, Ren and Hongchi Shi, "Parallel Machine Translation: Principles and Practice," Engineering of Complex Computer Systems, 2001 Proceedings, Seventh IEEE Int'l. Conference, pp. 249-259, 2001.

Fung et al, "Mining Very-non parallel corpora: Parallel sentence and lexicon extractioin via bootstrapping and EM", In EMNLP 2004.

Fung, P. and Yee, L., "An IR Approach for Translating New Words from Nonparallel, Comparable Texts", 1998, 36th Annual Meeting of the ACL, 17th International Conference on Computational Linguistics, pp. 414-420.

Fung, Pascale, "Compiling Bilingual Lexicon Entries From a Non-Parallel English-Chinese Corpus", 1995, Proc, of the Third Workshop on Very Large Corpora, Boston, MA, pp. 173-183.

Gale, W. and Church, K., "A Program for Aligning Sentences in Bilingual Corpora," 1991, 29th Annual Meeting of the ACL, pp. 177-183.

Gale, W. and Church, K., "A Program for Aligning Sentences in Bilingual Corpora," 1993, Computational Linguisitcs, vol. 19, No. 1, pp. 177-184.

Galley et al., "Scalable Inference and Training of Context-Rich Syntactic Translation Models," Jul. 2006, in Proc. of the 21st International Conference on Computational Linguistics, pp. 961-968.

Galley et al., "What's in a translation rule?", 2004, in Proc. of HLT/NAACL '04, pp. 1-8.

Gaussier et al, "A Geometric View on Bilingual Lexicon Extraction from Comparable Corpora", In Proceedings of ACL 2004, July.

Germann et al., "Fast Decoding and Optimal Decoding for Machine Translation", 2001, Proc. of the 39th Annual Meeting of the ACL, Toulouse, France, pp. 228-235.

Germann, Ulrich: "Building a Statistical Machine Translation System from Scratch: How Much Bang for the Buck Can We Expect?" Proc. of the Data-Driven MT Workshop of ACL-01, Toulouse, France, 2001.

Gildea, D., "Loosely Tree-based Alignment for Machine Translation," In Proceedings of the 41st Annual Meeting on Assoc. for Computational Linguistics—vol. 1 (Sapporo, Japan, Jul. 7-12, 2003). Annual Meeting of the ACL Assoc. for Computational Linguistics, Morristown, NJ, 80-87. DOI=http://dx.doi.org/10.3115/1075096.1075107.

Grefenstette, Gregory, "The World Wide Web as a Resource for Example-Based Machine Translation Tasks", 1999, Translating and the Computer 21, Proc. of the 21 st International Cant. on Translating and the Computer. London, UK, 12 pp.

Grossi et al, "Suffix Trees and their applications in string algorithms", In. Proceedings of the 1st South American Workshop on String Processing, Sep. 1993, pp. 57-76.

Gupta et al., "Kelips: Building an Efficient and Stable P2P DHT thorough Increased Memory and Background Overhead," 2003 IPTPS, LNCS 2735, pp. 160-169.

Habash, Nizar, "The Use of a Structural N-gram Language Model in Generation-Heavy Hybrid Machine Translation," University of Maryland, Univ. Institute for Advance Computer Studies, Sep. 8, 2004.

Hatzivassiloglou, V. et al., "Unification-Based Glossing",. 1995, Proc. of the International Joint Conference on Artificial Intelligence, pp. 1382-1389.

Huang et al., "Relabeling Syntax Trees to Improve Syntax-Based Machine Translation Quality," Jun. 4-9 2006, in Proc. of the Human Language Techology Conference of the North Americna Chapter of the ACL, pp. 240-247.

Ide, N. and Veronis, J., "Introduction to the Special Issue on Word Sense Disambiguation: The State of the Art", Mar. 1998, Computational Linguistics, vol. 24, Issue 1, pp. 2-40.

Ikel, D., Schwartz, R., and Weischedei, R., "An Algorithm that learns What's in a Name," Machine Learning 34, 211-231 (1999).

Imamura et al., "Feedback Cleaning of Machine Translation Rules Using Automatic Evaluation," 2003 Computational Linguistics, pp. 447-454.

Imamura, Kenji, "Hierarchical Phrase Alignment Harmonized with Parsing", 2001, in Proc. of NLPRS, Tokyo.

Jelinek, F., "Fast Sequential Decoding Algorithm Using a Stack", Nov. 1969, IBM J. Res. Develop., vol. 13, No. 6, pp. 675-685. (NPL0082).

Jones, K. Sparck, "Experiments in Relevance Weighting of Search Terms", 1979, Information Processing & Management, vol. 15, Pergamon Press Ltd., UK, pp. 133-144.

Klein et al., "Accurate Unlexicalized Parsing," Jul. 2003m, in Proc. of the 41st Annual Meeting of the ACL, pp. 423-430.

Knight et al., "Integrating Knowledge Bases and Statistics in MT," 1994, Proc. of the Conference of the Association for Machine Translation in the Americas.

Knight et al., "Filling Knowledge Gaps in a Broad-Coverage Machine Translation System", 1995, Proc. of the 14th International Joint Conference on Artificial Intelligence, Montreal, Canada, vol. 2, pp. 1390-1396.

Knight, K. and Al-Onaizan, Y., "A Primer on Finite-State Software for Natural Language Processing", 1999 (available at http://www.isLedullicensed-sw/carmel).

Knight, K. and Al-Onaizan, Y., "Translation with Finite -State Devices," Proceedings of the 4th AMTA Conference, 1998.

Knight, K. and Chander, I., "Automated Postediting of Documents,"1994, Proc. of the 12th Conference on Artificial Intelligence, pp. 779-784.

Knight, K. and Graehl, J., "Machine Transliteration", 1997, Proc. of the ACL-97, Madrid, Spain, pp. 128-135.

Knight, K. and Hatzivassiloglou, V., "Two-Level, Many-Paths Generation," D 1995, Proc. of the 33rd Annual Conference of the ACL, pp. 252-260.

Knight, K. and Luk, S., "Building a Large-Scale Knowledge Base for Machine Translation," 1994, Proc. of the 12th Conference on Artificial Intelligence, pp. 773-778.

Knight, K. and Marcu, D., "Statistics-Based Summarization—Step One: Sentence Compression," 2000, American Association for Artificial Intelligence Conference, pp. 703-710.

Knight, K. and Yamada, K., "A Computational Approach to Deciphering Unknown Scripts," 1999, Proc. of the ACL Workshop on Unsupervised Learning in Natural Language Processing.

Knight, Kevin, "A Statistical MT Tutorial Workbook," 1999, JHU Summer Workshop (available at http://www.isLedu/natural-language/mUwkbk.rtf).

Knight, Kevin, "Automating Knowledge Acquisition for Machine Translation," 1997, AI Magazine 18(4).

Knight, Kevin, "Connectionist Ideas and Algorithms," Nov. 1990, Communications of the ACM, vol. 33, No. 11, pp. 59-74.

Knight, Kevin, "Decoding Complexity in Word-Replacement Translation Models", 1999, Computational Linguistics, 25(4).

Knight, Kevin, "Integrating Knowledge Acquisition and Language Acquisition", May 1992, Journal of Applied Intelligence, vol. 1, No. 4.

Knight, Kevin, "Learning Word Meanings by Instruction,"1996, Proc. of the D National Conference on Artificial Intelligence, vol. 1, pp. 447-454.

Knight, Kevin, "Unification: A Multidisciplinary Survey," 1989, ACM Computing Surveys, vol. 21, No. 1.

Koehn, Philipp, "Noun Phrase Translation," A PhD Dissertation for the University of Southern California, pp. xiii, 23, 25-57, 72-81, Dec. 2003.

Koehn, P. and Knight, K., "ChunkMT: Statistical Machine Translation with Richer Linguistic Knowledge," Apr. 2002, Information Sciences Institution.

Koehn, P. and Knight, K., "Estimating Word Translation Probabilities from Unrelated Monolingual Corpora Using the EM Algorithm," 2000, Proc. of the 17th meeting of the AAAI.

Koehn, P. and Knight, K., "Knowledge Sources for Word-Level Translation Models," 2001, Conference on Empirical Methods in Natural Language Processing.

Kumar, R. and Li, H., "Integer Programming Approach to Printed Circuit Board Assembly Time Optimization," 1995, IEEE Transactions on Components, Packaging, and Manufacturing, Part B: Advance Packaging, vol. 18, No. 4. pp. 720-727.

Kupiec, Julian, "An Algorithm for Finding Noun Phrase Correspondecnes in Bilingual Corpora," In Proceedings of the 31st Annual Meeting of the ACL, 1993, pp. 17-22.

Kurohashi, S. and Nagao, M., "Automatic Detection of Discourse Structure by Checking Surface Information in Sentences," 1994, Proc. of COL-LING '94, vol. 2, pp. 1123-1127.

Langkilde, I. and Knight, K., "Generation that Exploits Corpus-Based Statistical Knowledge," 1998, Proc. of the COLING-ACL, pp. 704-710.

Langkilde, I. and Knight, K., "The Practical Value of N-Grams in Generation," 1998, Proc. of the 9th International Natural Language Generation Workshop, pp. 248-255.

Langkilde, Irene, "Forest-Based Statistical Sentence Generation," 2000, Proc. of the 1st Conference on North American chapter of the ACL, Seattle, WA, pp. 170-177.

Langkilde-Geary, Irene, "A Foundation for General-Purpose Natural Language Generation: Sentence Realization Using Probabilistic Models of Language," 2002, Ph.D. Thesis, Faculty of the Graduate School, University of Southern California.

Langkilde-Geary, Irene, "An Empirical Verification of Coverage and Correctness for a General-Purpose Sentence Generator," 1998, Proc. 2nd Int'l Natural Language Generation Conference.

Lee-Y.S.,"Neural Network Approach to Adaptive Learning: with an Application to Chinese Homophone Disambiguation," IEEE pp. 1521-1526.

Lita, L., et al., "tRuEcasing," Proceedings of the 41st Annual Meeting of the Assoc. for Computational Linguistics (In Hinrichs, E. and Roth, D.—editors), pp. 152-159.

Mann, G. and Yarowsky, D., "Multipath Translation Lexicon Induction via Bridge Languages," 2001, Proc. of the 2nd Conference of the North American Chapter of the ACL, Pittsburgh, PA, pp. 151-158.

Manning, C. and Schutze, H., "Foundations of Statistical Natural Language Processing," 2000, The MIT Press, Cambridge, MA [redacted].

Marcu, D. and Wong, W., "A Phrase-Based, Joint Probability Model for Statistical Machine Translation," 2002, Proc. of ACL-2 conference on Empirical Methods in Natural Language Processing, vol. 10, pp. 133-139.

Marcu, Daniel, "Building Up Rhetorical Structure Trees," 1996, Proc. of the National Conference on Artificial Intelligence and Innovative Applications of Artificial Intelligence Conference, vol. 2, pp. 1069-1074.

Marcu, Daniel, "Discourse trees are good indicators of importance in text," 1999, Advances in Automatic Text Summarization, The MIT Press, Cambridge, MA.

Marcu, Daniel, "Instructions for Manually Annotating the Discourse Structures of Texts," 1999, Discourse Annotation, pp. 1-49.

Marcu, Daniel, "The Rhetorical Parsing of Natural Language Texts," 1997, Proceedings of ACLIEACL '97, pp. 96-103.

Marcu, Daniel, "The Rhetorical Parsing, Summarization, and Generation of Natural Language Texts," 1997, Ph.D. Thesis, Graduate Department of Computer Science, University of Toronto.

Marcu, Daniel, "Towards a Unified Approach to Memory- and Statistical-Based Machine Translation," 2001, Proc. of the 39th Annual Meeting of the ACL, pp. 378-385.

McCallum, A. and Li, W., "Early Results for Named Entity Recognition with Conditional Random Fields, Feature Induction and Web-enhanced Lexicons," In Proceedings of the Seventh Conference on Natural Language Learning at HLT-NAACL, 2003, vol. 4 (Edmonton, Canada), Assoc. for Computational Linguistics, Morristown, NJ, pp. 188-191.

Melamed, I. Dan, "A Word-to-Word Model of Translational Equivalence," 1997, Proc. of the 35th Annual Meeting of the ACL, Madrid, Spain, pp. 490-497.

Melamed, I. Dan, "Automatic Evaluation and Uniform Filter Cascades for Inducing N-Best Translation Lexicons," 1995, Proc. of the 3rd Workshop on Very Large Corpora, Boston, MA, pp. 184-198.

Melamed, I. Dan, "Empirical Methods for Exploiting Parallel Texts," 2001, MIT Press, Cambridge, MA [table of contents].

Meng et al.. "Generating Phonetic Cognates to Handle Named Entities in English-Chinese Cross-Language Spoken Document Retrieval," 2001, IEEE Workshop on Automatic Speech Recognition and Understanding. pp. 311-314.

Mikheev et al., "Named Entity Recognition without Gazeteers," 1999, Proc. of European Chapter of the ACL, Bergen, Norway, pp. 1-8.

Miike et al., "A full-text retrieval system with a dynamic abstract generation function," 1994, Proceedings of SI-GIR '94, pp. 152-161.

Mohri, M. and Riley, M., "An Efficient Algorithm for the N-Best-Strings Problem," 2002, Proc. of the 7th Int. Conf. on Spoken Language Processing (ICSLP'02), Denver, CO, pp. 1313-1316.

Mohri, Mehryar, "Regular Approximation of Context Free Grammars Through Transformation", 2000, pp. 251-261, "Robustness in Language and Speech Technology", Chapter 9, Kluwer Academic Publishers.

Monasson et al., "Determining computational complexity from characteristic 'phase transitions'," Jul. 1999, Nature Magazine, vol. 400, pp. 133-137.

Mooney, Raymond, "Comparative Experiments on Disambiguating Word Senses: An Illustration of the Role of Bias in Machine Learning," 1996, Proc. of the Conference on Empirical Methods in Natural Language Processing, pp. 82-91.

Nederhof, M. and Satta, G., "IDL-Expressions: A Formalism for Representing and Parsing Finite Languages in Natural Language Processing," 2004, Journal of Artificial Intelligence Research, vol. 21, pp. 281-287.

Niessen,S. and Ney, H, "Toward hierarchical models for statistical machine translation of inflected languages," 2001, Data-Driven Machine Translation Workshop, Toulouse, France, pp. 47-54.

Norvig, Peter, "Techniques for Automatic Memoization with Applications to Context-Free Parsing", Compuational Linguistics, 1991, pp. 91-98, vol. 17, No. 1.

Och et al., "Improved Alignment Models for Statistical Machine Translation," 1999, Proc. of the Joint Conf. of Empirical Methods in Natural Language Processing and Very Large Corpora, pp. 20-28.

Och et al. "A Smorgasbord of Features for Statistical Machine Translation." HLTNAACL Conference. Mar. 2004, 8 pages.

Och, F., "Minimum Error Rate Training in Statistical Machine Translation," In Proceedings of the 41st Annual Meeting on Assoc. for Computational Linguistics—vol. 1 (Sapporo, Japan, Jul. 7-12, 2003). Annual Meeting of the ACL. Assoc. for Computational Linguistics, Morristown, NJ, 160-167. DOI= http://dx.doi.org/10.3115/1075096.

Och, F. and Ney, H, "Improved Statistical Alignment Models," 2000, 38th Annual Meeting of the ACL, Hong Kong, pp. 440-447.

Och, F. and Ney, H., "Discriminative Training and Maximum Entropy Models for Statistical Machine Translation," 2002, Proc. of the 40th Annual Meeting of the ACL, Philadelphia, PA, pp. 295-302.

Och, F. and Ney, H., "A Systematic Comparison of Various Statistical Alignment Models," Computational Linguistics, 2003, 29:1, 19-51.

Papineni et al., "Bleu: A Method for Automatic Evaluation of Machine Translation," 2001, IBM Research Report, RC22176(WQ102-022).

Petrov et al., "Learning Accurate, Compact and Interpretable Tree Annotation," Jun. 4-9, 2006, in Proc. of the Human Language Technology Conference of the North American Chapter of the ACL, pp. 433-440.

Pla et al., "Tagging and Chunking with Bigrams," 2000, Proc. of the 18th Conference on Computational Linguistics, vol. 2, pp. 614-620.

Qun, Liu, "A Chinese-English Machine Translation System Based on Micro-Engine Architecture," An Int'l. Conference on Translation and Information Technology, Hong Kong, Dec. 2000, pp. 1-10.

Rapp, Reinhard, Automatic Identification of Word Translations from Unrelated English and German Corpora, 1999, 37th Annual Meeting of the ACL, pp. 519-526.
Rapp, Reinhard, "Identifying Word Translations in Non-Parallel Texts," 1995, 33rd Annual Meeting of the ACL, pp. 320-322.
Rayner et al.,"Hybrid Language Processing in the Spoken Language Translator," IEEE, pp. 107-110.
Resnik, P. and Smith, A., "The Web as a Parallel Corpus," Sep. 2003, Computational Linguistics, Special Issue on Web as Corpus, vol. 29, Issue 3, pp. 349-380.
Resnik, P. and Yarowsky, D. "A Perspective on Word Sense Disambiguation Methods and Their Evaluation," 1997, Proceedings of SIGLEX '97, Washington, D.C., pp. 79-86.
Resnik, Philip, "Mining the Web for Bilingual Text," 1999, 37th Annual Meeting of the ACL, College Park, MD, pp. 527-534.
Rich, E. and Knight, K., "Artificial Intelligence, Second Edition," 1991, McGraw-Hili Book Company [redacted].
Richard et al., "Visiting the Traveling Salesman Problem with Petri nets and application in the glass industry," Feb. 1996, IEEE Emerging Technologies and Factory Automation, pp. 238-242.
Robin, Jacques, "Revision-Based Generation of Natural Language Summaries Providing Historical Background: Corpus-Based Analysis, Design Implementation and Evaluation," 1994, Ph.D. Thesis, Columbia University, New York.
Rogati et al., "Resource Selection for Domain-Specific Cross-Lingual IR," ACM 2004, pp. 154-161.
Ruiqiang, Z. et al., "The NiCT-ATR Statistical Machine Translation System for the IWSLT 2006 Evaluation," submitted to IWSLT, 2006.
Russell, S. and Norvig, P., "Artificial Intelligence: A Modern Approach," 1995, Prentice-Hall, Inc., New Jersey [redacted—table of contents].
Sang, E. and Buchholz, S., "Introduction to the CoNLL-2000 Shared Task: Chunking," 20002, Proc. of CoNLL-2000 and LLL-2000, Lisbon, Portugal, pp. 127-132.
Schmid, H., and Schulte im Walde, S., "Robust German Noun Chunking With a Probabilistic Context-Free Grammar," 2000, Proc. of the 18th Conference on Computational Linguistics, vol. 2, pp. 726-732.
Schutze, Hinrich, "Automatic Word Sense Discrimination," 1998, Computational Linguistics, Special Issue on Word Sense Disambiguation, vol. 24, Issue 1, pp. 97-123.
Selman et al., "A New Method for Solving Hard Satisfiability Problems," 1992, Proc. of the 10th National Conference on Artificial Intelligence, San Jose, CA, pp. 440-446.
Kumar, S. and Byrne, W., "Minimum Bayes-Risk Decoding for Statistical Machine Translation." HLTNAACL Conference. Mar. 2004, 8 pages.
Shapiro, Stuart (ed.), "Encyclopedia of Artificial Intelligence, 2nd edition", vol. D 2,1992, John Wiley & Sons Inc; "Unification" article, K. Knight, pp. 1630-1637.
Shirai, S., "A Hybrid Rule and Example-based Method for Machine Translation," NTT Communication Science Laboratories, pp. 1-5.
Sobashima et al., "A Bidirectional Transfer-Driven Machine Translation System for Spoken Dialogues," 1994, Proc. of 15th Conference on Computational Linguistics, vol. 1, pp. 64-68.
Soricut et al., "Using a large monolingual corpus to improve translation accuracy," 2002, Lecture Notes in Computer Science, vol. 2499, Proc. of the 5th Conference of the Association for Machine Translation in the Americas on Machine Translation: From Research to Real Users, pp. 155-164.
Stalls, B. and Knight, K., "Translating Names and Technical Terms in Arabic Text," 1998, Proc. of the COLING/ACL Workkshop on Computational Approaches to Semitic Language.
Sumita et al., "A Discourse Structure Analyzer for Japanese Text," 1992, Proc. of the International Conference on Fifth Generation Computer Systems, vol. 2, pp. 1133-1140.
Sun et al., "Chinese Named Entity Identification Using Class-based Language Model," 2002, Proc. of 19th International Conference on Computational Linguistics, Taipei, Taiwan, vol. 1, pp. 1-7.
Tanaka, K. and Iwasaki, H. "Extraction of Lexical Translations from Non-Aligned Corpora," Proceedings of COLING 1996.
Taskar, B., et al., "A Discriminative Matching Approach to Word Alignment," In Proceedings of the Conference on Human Language Technology and Empirical Methods in Natural Language Processing (Vancouver, BC, Canada, Oct. 6-8, 2005). Human Language Technology Conference. Assoc. for Computational Linguistics, Morristown, NJ.
Taylor et al., "The Penn Treebank: An Overview," in A. Abeill (ed.), D Treebanks: Building and Using Parsed Corpora, 2003, pp. 5-22.
Tiedemann, Jorg, "Automatic Construction of Weighted String Similarity Measures," 1999, in Proceedings of the Joint SIGDAT Conference on Emperical Methods in Natural Language Processing and Very Large Corpora.
Tillman, C. and Xia, F., "A Phrase-Based Unigram Model for Statistical Machine Translation," 2003, Proc. of the North American Chapter of the ACL on Human Language Technology, vol. 2, pp. 106-108.
Tillmann et al., "A DP based Search Using Monotone Alignments in Statistical Translation," 1997, Proc. of the Annual Meeting of the ACL, pp. 366-372.
Tomas, J., "Binary Feature Classification for Word Disambiguation in Statistical Machine Translation," Proceedings of the 2nd Int'l. Workshop on Pattern Recognition, 2002, pp. 1-12.
Uchimoto, K. et al., "Word Translation by Combining Example-based Methods and Machine Learning Models," Natural Language Processing (Shizen Gengo Shori), vol. 10, No. 3, Apr. 2003, pp. 87-114.
Uchimoto, K. et al., "Word Translation by Combining Example-based Methods and Machine Learning Models," Natural Language Processing (Shizen Gengo Shori), vol. 10, No. 3, Apr. 2003, pp. 87-114. (English Translation).
Ueffing et al., "Generation of Word Graphs in Statistical Machine Translation," 2002, Proc. of Empirical Methods in Natural Language Processing (EMNLP), pp. 156-163.
Varga et al, "Parallel Corpora for Medium Density Languages", In Proceedings of RANLP 2005, pp. 590-596.
Veale, T. and Way, A., "Gaijin: A Bootstrapping, Template-Driven Approach to Example-Based MT," 1997, Proc. of New Methods in Natural Language Processing (NEMPLP97), Sofia, Bulgaria.
Vogel et al., "The CMU Statistical Machine Translation System," 2003, Machine Translation Summit IX, New Orleans, LA.
Vogel et al., "The Statistical Translation Module in the Verbmobil System," 2000, Workshop on Multi-Lingual Speech Communication, pp. 69-74.
Vogel, S. and Ney, H., "Construction of a Hierarchical Translation Memory," 2000, Proc. of Cooling 2000, Saarbrucken, Germany, pp. 1131-1135.
Wang, Y. and Waibel, A., "Decoding Algorithm in Statistical Machine Translation," 1996, Proc. of the 35th Annual Meeting of the ACL, pp. 366-372.
Wang, Ye-Yi, "Grammar Inference and Statistical Machine Translation," 1998, Ph.D Thesis, Carnegie Mellon University, Pittsburgh, PA.
Watanabe et al., "Statistical Machine Translation Based on Hierarchical Phrase Alignment," 2002, 9th International Conference on Theoretical and Methodological Issues in Machin Translation (TMI-2002), Keihanna, Japan, pp. 188-198.
Witbrock, M. and Mittal, V., "Ultra-Summarization: A Statistical Approach to Generating Highly Condensed Non-Extractive Summaries," 1999, Proc. of SIGIR '99, 22nd International Conference on Research and Development in Information Retrieval, Berkeley, CA, pp. 315-316.
Wu, Dekai, "A Polynomial-Time Algorithm for Statistical Machine Translation," 1996, Proc. of 34th Annual Meeting of the ACL, pp. 152-158.
Wu, Dekai, "Stochastic Inversion Transduction Grammars and Bilingual Parsing of Parallel Corpora," 1997, Computational Linguistics, vol. 23, Issue 3, pp. 377-403.
Yamada, K. and Knight, K. "A Syntax-based Statistical Translation Model," D 2001, Proc. of the 39th Annual Meeting of the ACL, pp. 523-530.
Yamada, K. and Knight, K., "A Decoder for Syntax-based Statistical MT," 2001, Proceedings of the 40th Annual Meeting of the ACL, pp. 303-310.
Yamada K., "A Syntax-Based Statistical Translation Model," 2002 PhD Dissertation, pp. 1-141.

Yamamoto et al., "A Comparative Study on Translation Units for Bilingual Lexicon Extraction," 2001, Japan Academic Association for Copyright Clearance, Tokyo, Japan.

Yamamoto et al, "Acquisition of Phrase-level Bilingual Correspondence using Dependency Structure" In Proceedings of COLING-2000, pp. 933-939.

Yarowsky, David, "Unsupervised Word Sense Disambiguation Rivaling Supervised Methods," 1995, 33rd Annual Meeting of the ACL, pp. 189-196.

Zhang et al., "Synchronous Binarization for Machine Translations," Jun. 4-9, 2006, in Proc. of the Human Language Technology Conference of the North American Chapter of the ACL, pp. 256-263.

Zhang et al., "Distributed Language Modeling for N-best List Re-ranking," In Proceedings of the 2006 Conference on Empirical Methods in Natural Language Processing (Sydney, Australia, Jul. 22-23, 2006). ACL Workshops. Assoc. for Computational Linguistics, Morristown, NJ, 216-223.

Patent Cooperation Treaty International Preliminary Report on Patentability and the Written Opinion, International application No. PCT/US2008/004296, Oct. 6, 2009, 5 pgs.

Document, Wikipedia.com, web.archive.org (Feb. 24, 2004) <http://web.archive.org/web/20040222202831 /http://en.wikipedia.org/wikiiDocument>, Feb. 24, 2004.

Identifying, Dictionary.com, wayback.archive.org (Feb. 28, 2007) <http://wayback.archive.org/web/200501 01OOOOOO*/http:////dictionary.reference.com//browse//identifying>, Feb. 28, 2005 <http://web.archive.org/web/20070228150533/http://dictionary.reference.com/browse/identifying>.

Koehn, P. et al. "Statistical Phrase-Based Translation" Proceedings from HLT-NAACL 2003 Main Papers, pp. 48-54 Edmonton, May-Jun. 2003.

Abney, S.P., "Stochastic Attribute Value Grammars", Association for Computional Linguistics, 1997, pp. 597-618.

Fox, H., "Phrasal Cohesion and Statistical Machine Translation" Proceedings of the Conference on Empirical Methods in Natural Language Processing, Philadelphia, Jul. 2002, pp. 304-311. Association for Computational Linguistics. <URL: http://acl.ldc.upenn.edu/W/W02/W02-1039.pdf>.

Tillman, C., et al, "Word Reordering and a Dynamic Programming Beam Search Algorithm for Statistical Machine Translation" <URL: http://acl.ldc.upenn.edu/J/J03/J03-1005.pdf>.

Wang, W., et al. "Capitalizing Machine Translation" in HLT-NAACL '06 Proceedings Jun. 2006. <http://www.isi.edu/natural-language/mt/hlt-naacl-06-wang.pdf>.

Langlais, P. et al., "TransType: A Computer-Aided Translation Typing System" EmbedMT '00 ANLP-NAACL 2000 Workshop: Embedded Machine Translation Systems, 2000, pp. 46-51. <http://acl.ldc.upenn.edu/W/W00/W00-0507.pdf>.

Bangalore, S. and Rambow, O., "Using TAGs, a Tree Model, and a Language Model for Generation," May 2000,Workshop TAG+5, Paris.

Gale, W. and Church, K., "A Program for Aligning Sentences in Bilingual Corpora," 1993, Computational Linguisitcs, vol. 19, No. 1, pp. 75-102.

Ueffing et al., "Using Pos Information for Statistical Machine Translation into Morphologically Rich Languages," in EACL, 2003: Proceedings of the Tenth Conference on European Chapter of the Association for Computational Linguistics, pp. 347-354.

Frederking et al., "Three Heads are Better Than One," In Proceedings of the 4th Conference on Applied Natural Language Processing, Stuttgart, Germany, 1994, pp. 95-100.

Och et al., "Discriminative Training and Maximum Entropy Models for Statistical Machine Translation," In Proc. of the 40th Annual Meeting of the Association for Computational Linguistics (ACL), Philadelphia, PA, 2002.

Yasuda et al., "Automatic Machine Translation Selection Scheme to Output the Best Result," Proc of LREC, 2002, pp. 525-528.

Liu et al., "Context Discovery Using Attenuated Bloom Filters in Ad-Hoc Networks," Springer, pp. 13-25, 2006.

* cited by examiner

The iPhone Launches....From Linksys

Submitted by flungster

The iPhone does exist, but it's not what you think. Linksys launched a wireless Skype phone today that the company is calling the "iPhone."

✏️ Edit story | 🖉 Add a comment | ✏️ Have a suggestion?

View this story in | Arabic | Chinese | French | Spanish |

By ralphy made at 2006-12-18 15:53:27

You Apple-bashers will be thrilled to hear that I'm in the market for a new phone or phone/PDA, and I'm waiting for the Apple phone before I decide what to do.

By theman made at 2006-12-19 16:05:40 might I suggest: a Windows Smartphone?

By ralphy made at 2006-12-20 09:12:40

So long as it doesn't require me to use Outlook!

By flungster made at 2006-12-20 12:30:02

Come on now... you know you want to use Outlook. It's only a matter of time.

FIG. 3

La iPhone lance... De Linksys

Translation Rating: -1 (0 Good / - Bad) | Good 👍 | Bad 👎

Submitted by flungster

"...a iPhone existe, mais il n'est pas ce que vous pensez Linksys a lance un telephone sans fil Skype aujourd'hui que la société appelle la "iPhone.""

✏️ Edit story  📝 Add a comment  | ✎ Have a suggestion?

View this story in | English(Original) | Arabic | Chinese | French | Spanish |

By ralphy made at 2006-12-18 15:53:27

Vous Apple-bashers seront ravis d'apprendre que je suis dans le marché pour un nouveau téléphone ou par téléphone/PDA, et je suis attend la Apple téléphone avant de décider quoi faire.

By theman made at 2006-12-19 16:05:40

Je suggère une Windows pourrait Smartphone?

By ralphy made at 2006-12-20 09:12:40

Aussi longtemps que cela ne m'oblige à utiliser Outlook!

By flungster made at 2006-12-20 12:30:02

Allons donc... vous savez que vous voulez utiliser Outlook. C'est seulement une question de temps.

MULTI-LINGUAL ONLINE COMMUNITY

BACKGROUND

1. Field of the Present Invention

This application relates generally to online communities and more specifically to providing a multi-lingual online community.

2. Related Art

Currently, the Internet, including the World-Wide Web (WWW), is used to publish material written in many languages. This material includes news articles, essays, blog posts, community discussion groups, business and shopping websites, and the like. In some instances, this material is posted in multiple languages. For example, an international hotel chain may publish multiple versions of a website in languages in which its guests are likely to communicate. For example, a hotel chain in Europe may post the same website in English, French, German, Italian, Spanish, and Romanian. When a guest accesses the website, the guest may be given an opportunity to select a preferred language. The hotel website may then download a "cookie" to the guest's computer indicating the preferred language so that when the guest subsequently visits the website, the corresponding version of the website is automatically displayed.

The Internet has further enabled people to meet and communicate with one another in online communities. Online communities, such as Digg, Deli.ci.ous, StumbledUpon, and Ars Technica enable members to provide content in the form of original articles and posts within discussion groups. Further, a member may provide a link to material posted by a third party. Other members may, in turn, comment on the material. For example, a member may provide a link to a blog posted on the Internet. After reading the material, another member may post a comment in reaction to the article. Further, other members may post additional comments in reaction to the comments posted by the members. In some communities, members can vote on or rate the articles posted in the communities.

In online communities, all of the members typically need to speak the same language in order to have meaningful discussions. Currently, this condition results in online communities that are segregated based on language. For example, an English speaker can not meaningfully participate in an Arabic-speaking online community and vice-versa. Further, membership in online communities is limited to members who speak the language of the community.

SUMMARY

A method for hosting a community in multiple languages is provided. The method comprises receiving a request from a first member of a community. The request indicates an instruction to post content written in a first language within the community. Next, the content is translated into a second language. Login information is received from a second member. The second member is associated with the second language. The translated content is displayed to the second member.

The method may further comprise retrieving the content from a content source. The second member may be associated with the second language via a profile. The content may comprise a post in a message board associated with the community or a comment associated with the community.

The method may further comprise providing a link to the content in the first language to the second member and the content may be displayed to the second member in the first language. Feedback may be received from the second member. The feedback may relate to the translation of the content or include a suggested translation.

A system for hosting a community in multiple languages may comprise a content module, a translation module, and a storage medium. The content module may receive a request from a first member of a community to post content in a first language within the community. The translation module may translate the content into a second language. The storage medium may store the translated content.

A computer readable medium having embodied thereon a program, the program being executable by a processor for performing a method for hosting a community in multiple languages is provided. The method comprises receiving a request from a first member of a community. The request indicates an instruction to post content written in a first language within the community. Next, the content is translated into a second language. Login information is received from a second member. The second member is associated with the second language. The translated content is displayed to the second member.

DETAILED DESCRIPTION

An exemplary method, system, and computer readable medium for hosting a multi-lingual community are provided. The multi-lingual community is an online community wherein a significant portion of content posted in the online community is translated into at least one language other than the language in which the content was originally posted. The multilingual community allows members who are otherwise unable to communicate with each other due to language barriers to each communicate in a preferred language in substantially real time. The multilingual community may include content generated by the members, such as posts within discussion groups, original articles, comments posted by the members relating to other content, and/or any type of media.

Figure 1:
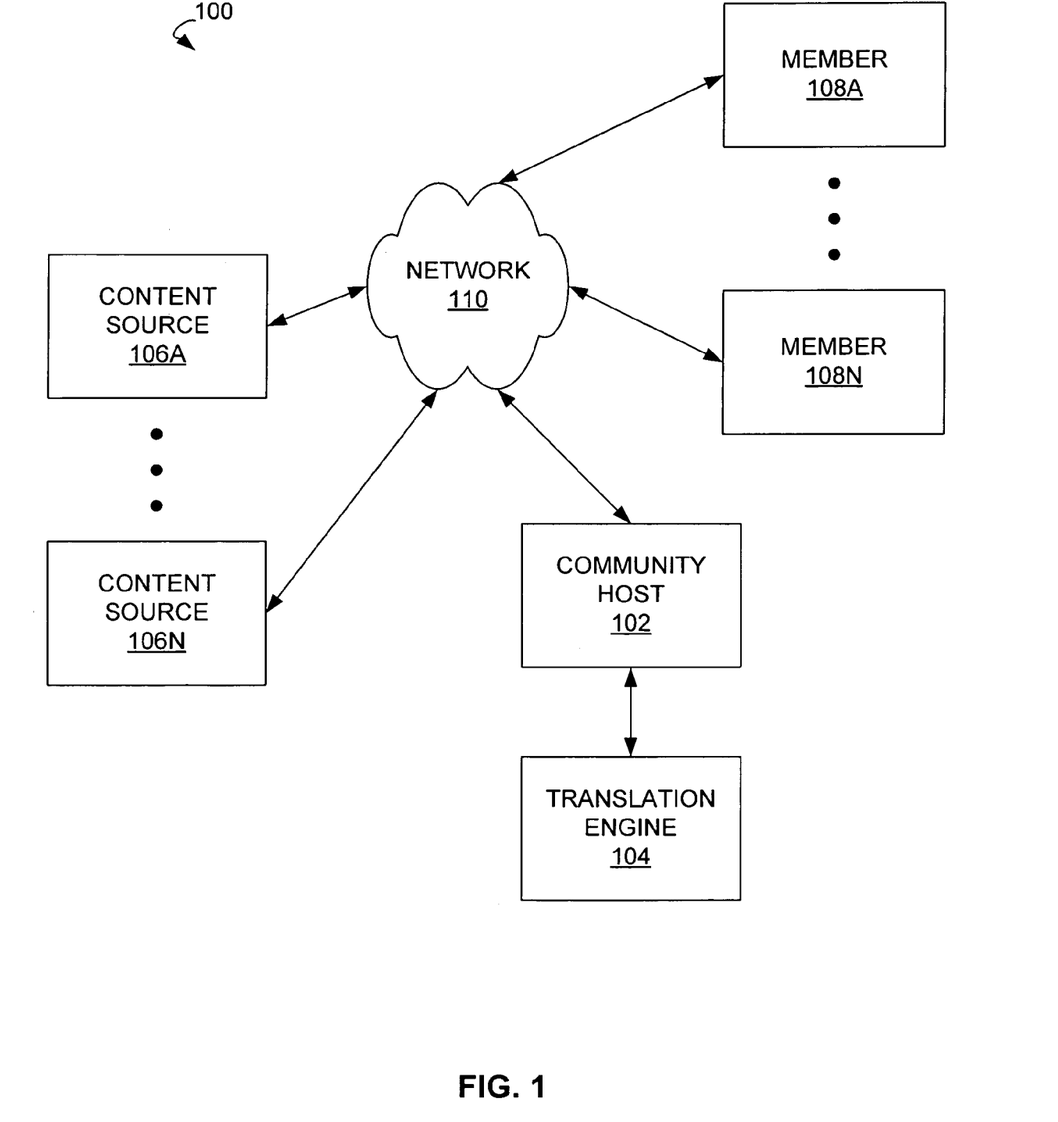
FIG. 1 depicts an exemplary environment in which various embodiments of the invention may be practiced.

FIG. 1 depicts an exemplary environment 100 in which various embodiments of the invention may be practiced. The environment 100 may comprise a community host 102, one or more content sources 106A through 106N, and one or more members 108A through 108N coupled via a network 110. The community host 102 may communicate with an external translation engine 104.

The community host 102 may host a website comprising an online community. The online community includes content selected and/or generated by the members 108A and 108N. The community host 102 may generate the website comprising the content associated with the online community. The community host 102 may include profiles of the members 108A through 108N indicating demographic information and/or various preferences, including a preferred language. The community host 102 may further include an interface allowing a user, such as the members 108A through 108N, to remove, edit, or add content to the online community. The community host 102 may further provide translations of the content via the translation engine 104.

The translation engine 104 is depicted separately from the community host 102 in FIG. 1. In other embodiments, and as described in FIG. 2, the translation engine 104 may be embodied in a module within the community host 102. The translation engine 104 may comprise a statistical machine translation (SMT) engine. The SMT engine generates a translation of a document based on a set of statistical probabilities associated with a source language of the document and a target language into which the document is translated. The translation engine 104, in other embodiments, may generate a translation according to a Translation Memory (TM) database comprising entries containing parallel translations of words and/or phrases in at least two languages.

The content sources 106A through 106N comprise websites typically not associated with the online community. However, one or more of the content sources 106A through 106N may be associated with the online community according to some embodiments. For example, the content source 106A may comprise an online newspaper, blog, a website associated with a business, or the like. The content source 106A, for example, may provide content in a plurality of languages. For example, a news website may post articles in English, French, Arabic, and Japanese.

The members 108A through 108N comprise users who are associated with the online community hosted by the community host 102. The members 108A through 108N may speak different languages. A member, such as the member 108A, may select content posted by the content source 106A in any language. Content in languages supported by the community host 102 may be translated into the other languages supported by the community host 102 and posted within the online community. The content may be posted within the online community by providing a link to the website of the content source 106A. In instances where the content appears in multiple languages at the content source 106A, links may be provided within the online community accordingly. The community host 102 may also generate a mirror copy of the content.

Each member, such as the member 108A, may generate content within the online community. For example, the member 108A may write an original article and post the article in the online community. The member 108A may also generate content by participating in a discussion group or by commenting on an article posted by another member, such as the member 108N.

In operation, the community host 102 receives the content and/or the content selections from the members 108A through 108N. The community host 102 posts the content and/or a link to the content within the online community. The translation engine 104 may associate the content with a source language and translate the content into at least one other target language. For example, the translation engine 104 may translate a copy of the content (e.g., a news article) selected by the member 108A. The translation engine 104 further translates the content generated by the members 108A through 108N of the online community. As such, if the member 108A logs into the online community, the member 108A is able to view the content or link to the content posted in the online community in a preferred language associated with the member 108A.

Figure 2:
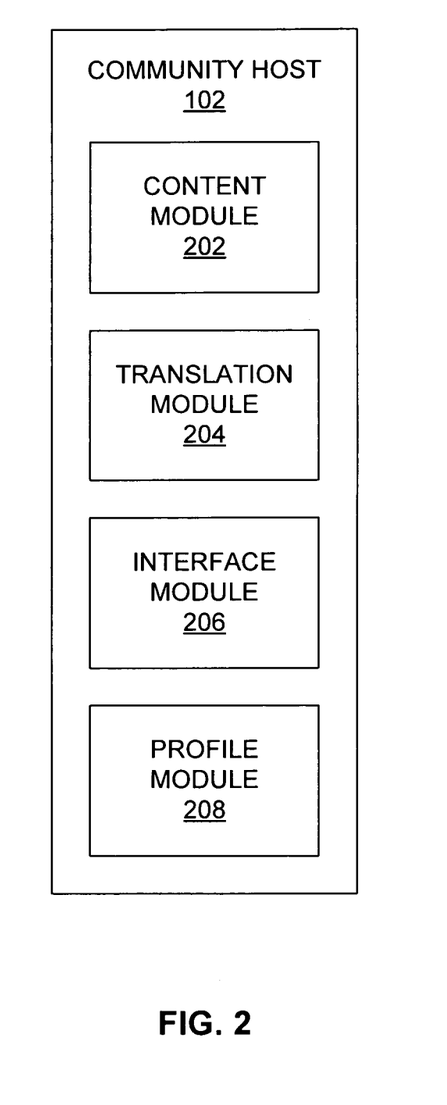
FIG. 2 depicts a block diagram of an exemplary community host according to various embodiments.

FIG. 2 depicts a block diagram of an exemplary community host 102 according to various embodiments. The community host 102 may comprise a content module 202, a translation module 204, an interface module 206, and a profile module 208. In exemplary embodiments, the community host 102 generates and maintains the online community.

The exemplary content module 202 retrieves and stores the content posted in the online community. The content module 202 may receive a request from a first member of a community to post content in a first language within the community and store the content itself, one or more links to the content, and/or translated copies of the content in a database or other storage medium. The content module 202 retrieves and arranges documents from a content source, such as the content sources 106A through 106N, comments associated with the documents, and/or posts within a discussion group in a website associated with the online community.

The translation module 204 comprises software, firmware, and/or hardware for translating the content into one or more languages. The translation module 204 may be based on SMT and/or TM. The translation module 204 may further generate language-specific versions of the online community. The translation module 204 is configured to generate translations of the user-selected and/or user-generated content within the community into at least one other language. The translation module 204 allows the members 108A through 108N to communicate with each other in each member's preferred language.

The interface module 206 generates a website or other interface for members 108A through 108N to view and add content to the online community. The interface module 206 may receive login information from a member 108A associated with a second language and display the translated content to the member 108A. To receive the login information, the interface module 206 may display a login interface to the member 108A. The member 108A may provide a password and screen name to login to the online community.

The screen name and/or a member's name may be verified by a profile module 208. The profile module 208 processes information associated with the members 108A through 108N. The profile module 208 may access a stored profile associated with the member 108A. The profile module 208 may also maintain or update a database comprising information such as a member login name, preferred language, demographic information, or the like. The preferred language information may be used by the content module 202 and the interface module 206 to display the online community in an individual member's preferred language if the member has logged into the online community. For example, the member 108A may generate a profile within the profile module 208 indicating that the member's preferred language is Arabic. If the member 108A subsequently logs in to the community host 102 via the online community website, the community host 102 will automatically transmit the Arabic version of the content posted within the community.

Although the community host 102 in FIG. 2 is illustrated as being comprised of the content module 202, the translation module 204, the interface module 206, and the profile module 208, fewer or more modules may comprise the community host 102 and still fall within the scope of various embodiments.

Figure 3:
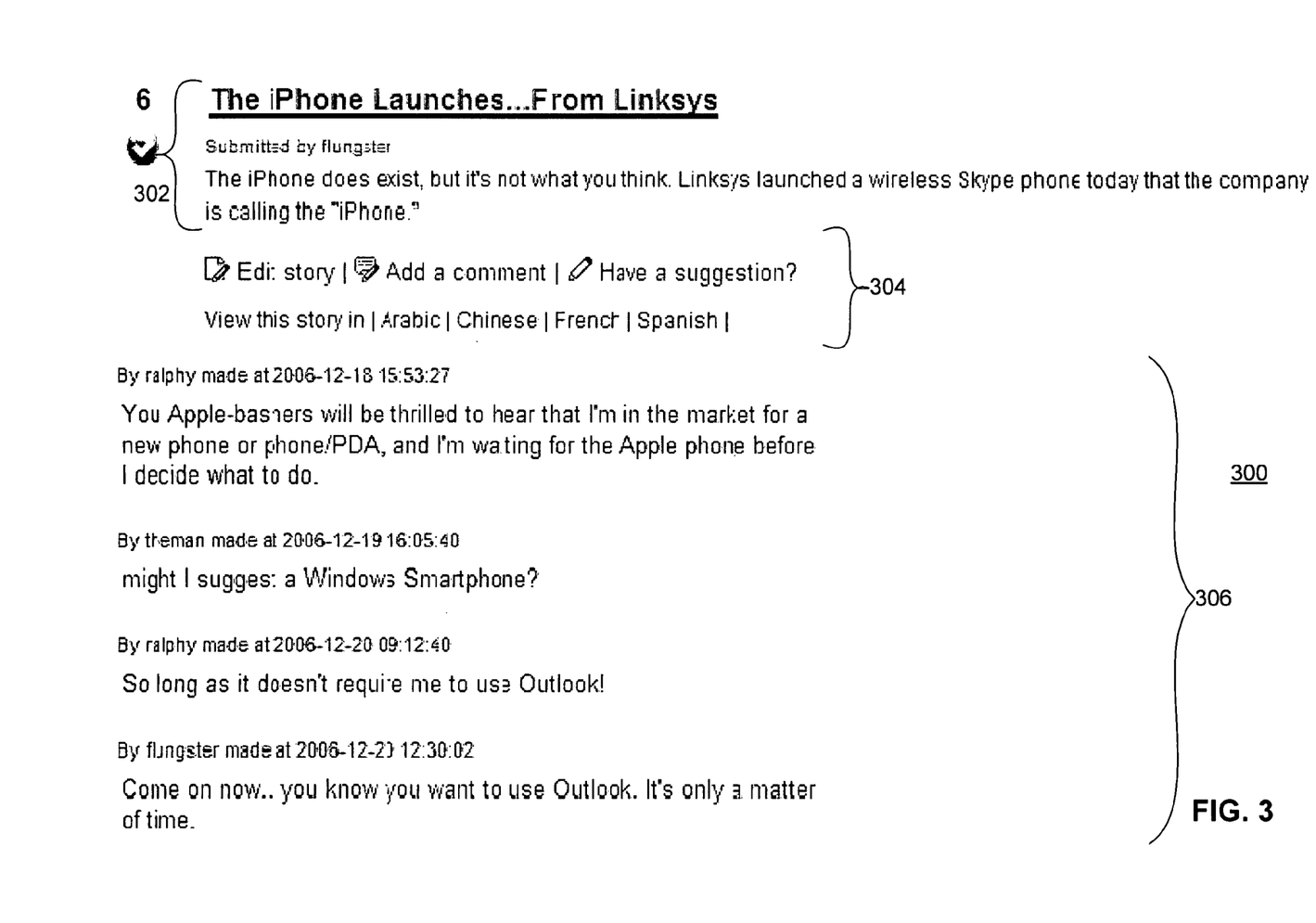
FIG. 3 depicts an exemplary screenshot of an online community in English according to various embodiments.

FIG. 3 depicts an exemplary screenshot 300 of an online community in English according to various embodiments. The screenshot 300 is an exemplary depiction of a webpage where member 108A may post a comment relating to content posted within the online community. In exemplary embodiments, the screenshot 300 may comprise original content 302, menu items 304, and comments 306.

The original content 302 may comprise the content or a link to the content, a name or other identifier of the member 108A who posted the content, and/or an introduction to the content written by the member 108A. In various embodiments, the link may direct the member 108N to the original content posted by the content source 106A, a translation of the content posted by the content source 106A, or to a copy or translation of the content maintained by the community host 102. In some embodiments the link may be a text link.

In exemplary embodiments, the menu items 304 may comprise an option to edit the content, comment about the content, and/or make a suggestion regarding the content and/or a translation of the content. Further, the menu items 304 may include links to other translations of the content. For example, as shown, links to translations in Arabic, Chinese, French, and Spanish versions of the content and/or the comments 306 are provided.

The comments 306 comprise a listing of comments made by members 108A through 108N regarding the content. The comments 306 may further comprise a translation of a comment relating to the original content 302 posted by a member 108N. For example, the comment 306 may be translated to or from French.

Figure 4:
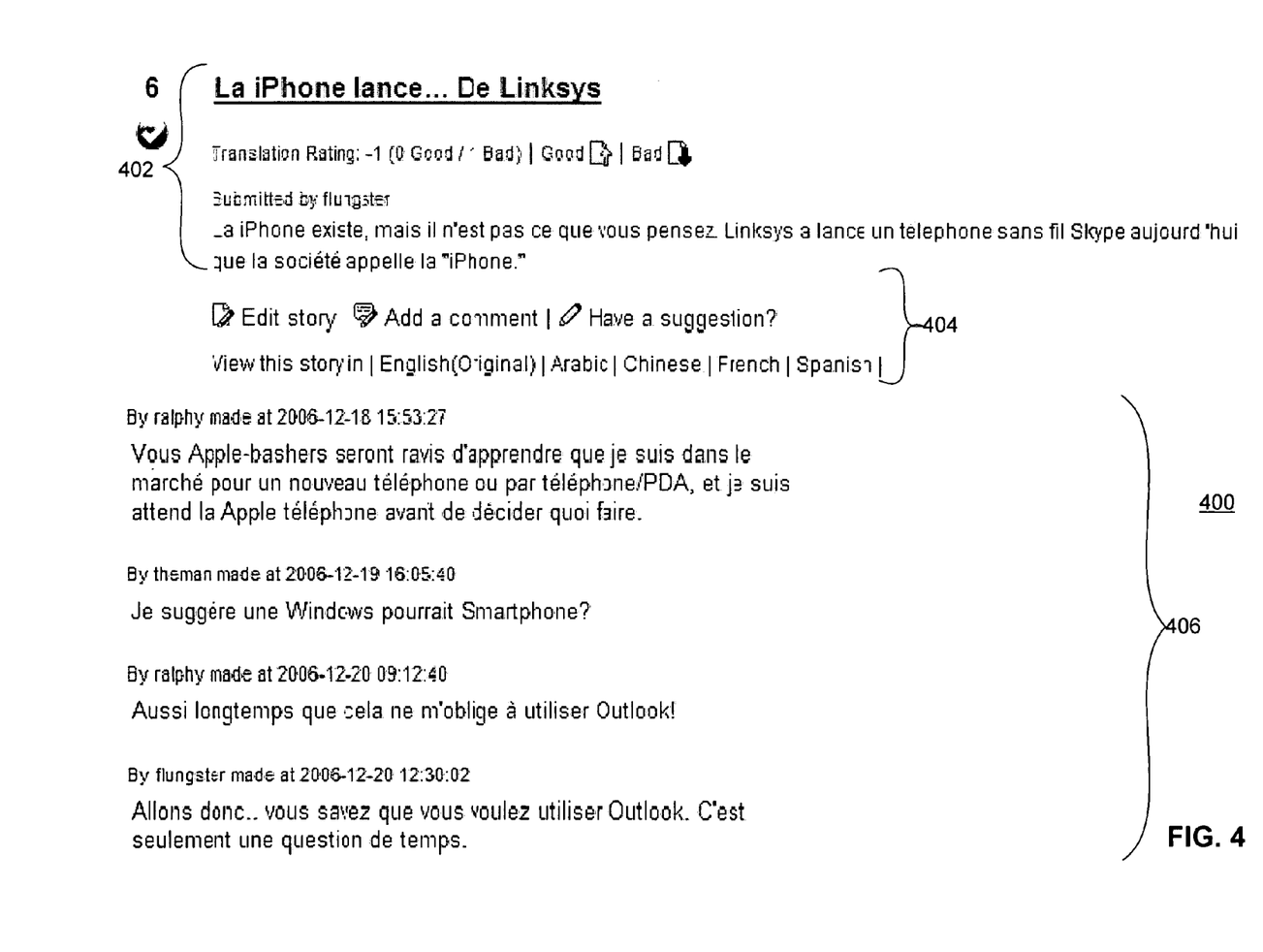
FIG. 4 depicts an exemplary screenshot of the online community in French according to various embodiments.

FIG. 4 depicts an exemplary screenshot 400 of the online community in French according to various embodiments. The screenshot 400 is an exemplary depiction of a webpage where the member 108A may post a comment relating to content posted within the online community. The screenshot 400 depicts a French-language version of the screenshot 300 of FIG. 3.

Like the screenshot 300, the screenshot 400 may comprise translated original content 402, menu items 404, and comments 406. The translated original content 402 may comprise a link to a translation of the original content 302. Further, the translated original content 402 may include an indication of a quality of the translation. The menu items 404 may be displayed in English (as depicted) or in the same language that the content and/or the comments are displayed. In this embodiment, for example, the menu items 404 may be displayed in French. The comments 406 may be translated into French from other languages or received in French and posted within the online community.

For example, in the embodiments depicted in FIG. 3 and FIG. 4, the member "ralphy" may be a French speaker, the member "flungster" may be an English speaker, and the member "theman" may be a Chinese speaker. The member "flungster" may post the original content 302 in the online community. The community host 102 may link to and/or generate a translation of the original content 302. The members "ralphy" and "theman" may view the French and Chinese translated original content 402, respectively. Each member may additionally post comments in their language and read the comments posted by the other members regardless of the original language that the content and the comments were written in. In this example, "flungster" may view screenshot 300 and "ralphy" may view screenshot 400.

Figure 5:
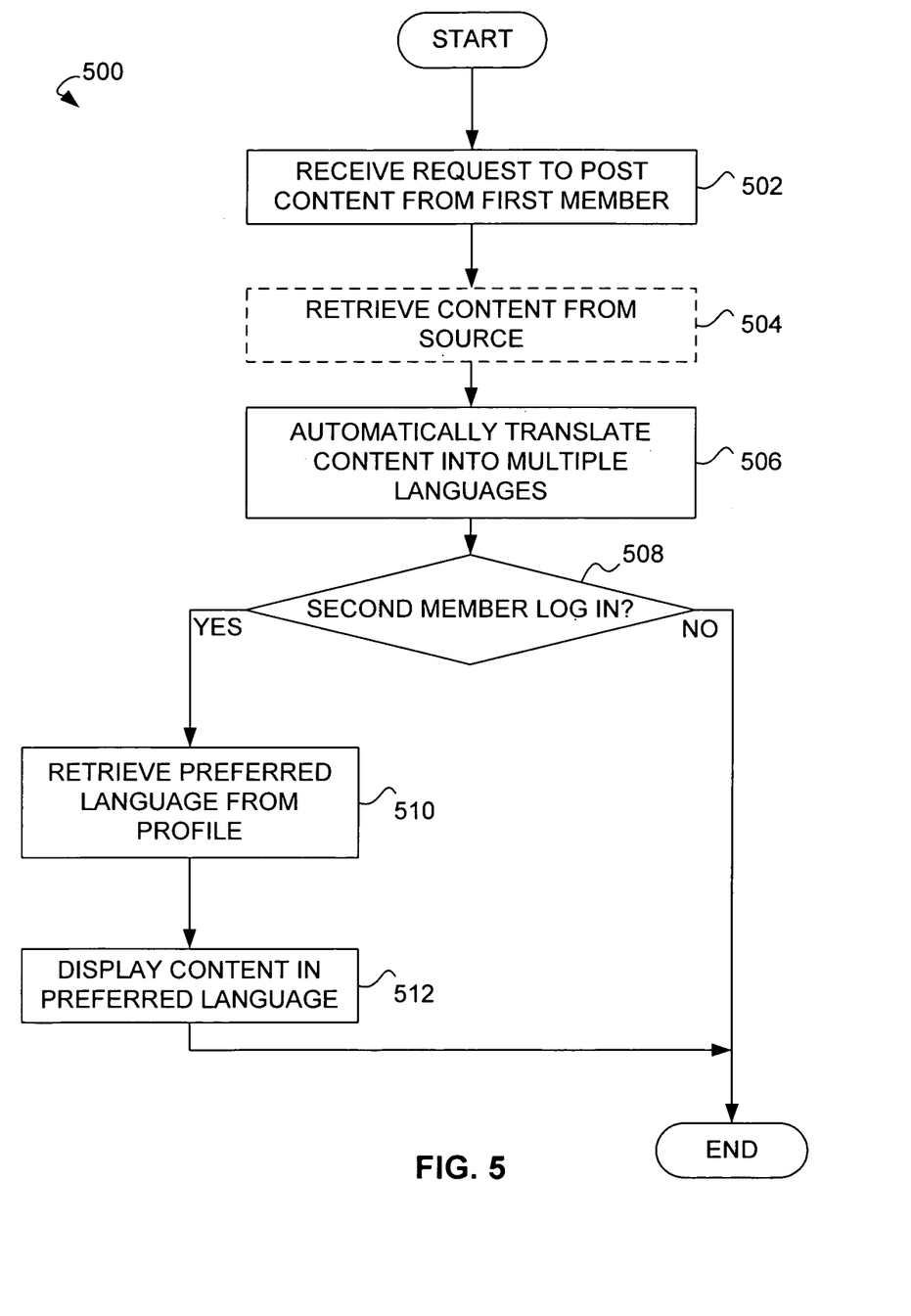
FIG. 5 depicts a flowchart illustrating an exemplary method for hosting a multi-lingual online community according to various embodiments.

FIG. 5 depicts a flowchart illustrating a process 500 for hosting a multi-lingual online community according to exemplary embodiments. In exemplary embodiments, the process 500 may be performed by the community host 102. The process 500 allows the members 108A through 108N to communicate with each other regardless of whether the members 108A through 108N speak the same language. The process 500 may be performed for each piece of the content selected and/or generated by the members 108A through 108N.

In step 502, a request to post content within the online community is received from a first member, such as the member 108A. The content may, comprise an article, media, or document posted by a content source, such as the content source 106A, or content generated by the member 108A, for example. In embodiments where the content is posted by the content source 106A, the content may be retrieved from the content source 106A by the content module 202 in step 504. In some embodiments, the content may be retrieved by generating at least one link to the content source 106A and/or generating a copy of the content.

In instances where the content source 106A posts the content in more than one language, additional translations may also be retrieved from the content source 106A. For example, if the member 108A selects the content from a hotel website that is published in English, French, German, Spanish, Italian, and Romanian, the content in each of the five languages may be retrieved from the hotel website and/or separately linked to the online community.

In embodiments where the content is generated by the member 108A, the content module 202 receives the content from the member 108A. In some embodiments, the content module 202 may associate the content with the member 108A. The content generated by the member 108A may be also associated with content retrieved from the content source 106A.

In step 506, the content may be automatically translated into one or more languages. In exemplary embodiments, the translation engine 104 or the translation module 204 may translate the content using an SMT engine and/or by referring to a TM database. In alternative embodiments, other forms of translation engines and databases may be utilized. The content may be translated into more than one language depending on the languages supported within the online community and/or requested by the members 108A through 108N.

In step 508, a determination may be made based on whether another member, such as a second member, has logged into the online community. For example, the second member may log in via the interface module 206. This second member may be associated with a profile indicating a preferred language. In step 510, the preferred language information may be retrieved from a database in which the second member's profile is maintained by, for example, the profile module 208. In some embodiments, the second member may be associated with more than one preferred language. In alternative embodiments, the translation may be generated in response to a request for content in a preferred language. To illustrate, rather than performing step 506 once the content is retrieved, the translation into the preferred language may be generated after step 510 is performed.

In step 512, the content within the community is displayed to the second member in the second member's preferred language by the interface module 206. Links to content from the content sources 106A through 106N may be provided according to the preferred language such that an English speaker views a link to the English version while a French speaker views a link to the French version. The second member may further select and/or generate additional content to be posted within the online community in the second member's preferred language. The content posted by the second member may be translated into the first member's language such that if the first member logs into the online community, the first member may view the content generated by the second member in the first member's preferred language.

To illustrate, the first member may generate a post, in Arabic, in a discussion group within the online community. An English-speaking second member may view an English translation of the post. The English-speaking second member may then post a reply in the discussion group in English. In turn, the first member may view an Arabic translation of the English language reply. Additional members may read and reply to the posts in other languages. Thus, members are able to communicate with one another in each member's preferred language.

Figure 6:
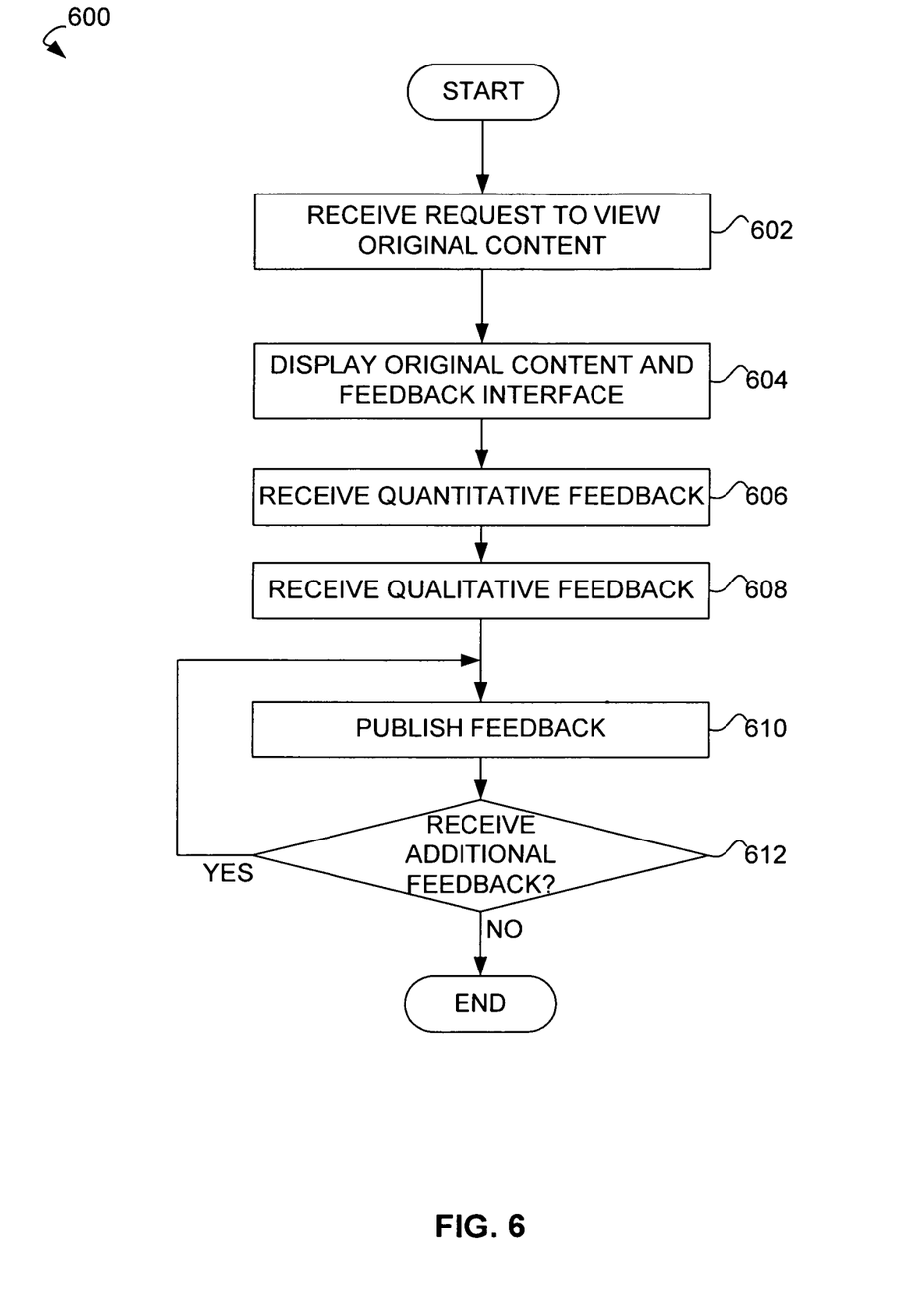
FIG. 6 depicts a flowchart illustrating an exemplary method for receiving translation feedback according to various embodiments.

FIG. 6 depicts a flowchart illustrating a method 600 for receiving translation feedback according to exemplary embodiments. A member who is fluent in, or has knowledge of, two or more languages may wish to view the original content even though it is not written in the member's preferred language. A member may wish to view the content if, for example, the translation is confusing, the member wishes to refine his or her knowledge of the language, or for other reasons. According to exemplary embodiments, translation feedback may be used to train an SMT engine if the translation feedback is collected by the translation engine 104 or the translation module 204.

In step 602, a request to view the original content is received from a member, such as the member 108A. The original content is the content in the language in which it was generated and/or retrieved. The original content is displayed in step 604. In some embodiments, a feedback interface may also be displayed.

In step 606, quantitative feedback may be received from the member 108A via the feedback interface. The quantitative feedback may include a rating indicating translation quality. For example, the member 108A may rate a translation on a numerical scale of one to five where a rating of one indicates an inaccurate translation, a rating of three indicates an accurate, but linguistically awkward, translation, and a rating of five indicates that the translation is both accurate and fluent. Any rating system may be utilized to provide feedback about the translation and any meaning may be assigned to rating symbols. For example, a rating of one or a non-numerical symbol may indicate a perfect translation according to some embodiments.

In step 608, qualitative feedback may be received from the member 108A. Qualitative feedback may include a comment about a specific aspect of the translation such as tone, slang usage, and so forth. Qualitative feedback may additionally include suggested translations for words or phrases within the content. For example, the member 108A may suggest an alternative translation for jargon or slang phrases used in the posted content. In one embodiment, qualitative feedback may additionally include a fully post edited version of the translation made available by the online community server; or a post edited version of a translation that was previously post edited by another community member.

In step 610, a qualitative feedback comprising a post edited version of the translation may be published in the online community. The post edited version of the translation may be reviewed by a human translator or automatic process for accuracy. For example, the human translator may be the member 108N. A further post edited version of the translation, or other feedback, may be received from the member 108N in step 612. The post edited version of the translation, or other feedback, received from member 108N may be posted in the online community by returning to step 610. If one of the post edited versions of the translation is accurate, the accurate version of the translation may be added to a training set in the SMT engine and/or TM database. In some embodiments, no feedback is collected when the original content is displayed.

The above-described functions and components can be comprised of instructions that are stored on a storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with various embodiments. Those skilled in the art are familiar with instructions, processor(s), and storage medium.

While various embodiments have been described above, it should be understood that they have been presented by way of example only, and not limitation. The scope of the present disclosure is in no way limited to the languages used to describe exemplary embodiments. Thus, the breadth and scope of a preferred embodiment should not be limited by any of the above-described exemplary embodiments.

What is claimed is:

1. A method for hosting a community in multiple languages on a server, the method comprising:
   receiving a request at the server via a network from a first member of the community to post content in a first language within the community, the content including a text link in the first language;
   translating the content, including the text link in the first language, into a second language;
   receiving login information at the server via a network from a second member associated with the second language;
   displaying the translated content to the second member;
   providing a link to the content in the first language to the second member; and
   receiving qualitative and quantitative feedback from the second member relating to the translation of the content, the feedback including a suggested translation,
   wherein the second member is associated with the second language via a profile.

2. The method recited in claim 1, further comprising retrieving the content from a content source.

3. The method recited in claim 1, wherein the content comprises a post in a message board associated with the community.

4. The method recited in claim 1, wherein the content comprises a comment associated with the community.

5. The method recited in claim 1, further comprising displaying the content in the first language to the second member.

6. The method recited in claim 1, wherein translating the content is performed using a statistical machine translation (SMT) engine.

7. The method recited in claim 6, further comprising training the SMT engine using the qualitative and quantitative feedback.

8. The method recited in claim 1, wherein translating the content is performed using a translation memory (TM) database.

9. The method recited in claim 1, further comprising generating a mirror copy of the content, wherein the mirror copy is in the second language.

10. A system for hosting a community in multiple languages comprising:
    a content module configured to receive a request from a first member of the community to post content in a first language within the community, the content including a text link in the first language;
    a translation module configured to translate the content, including the text link in the first language, into a second language;
    an interface module configured to receive login information from a second member associated with the second language, display the translated content to the second member, provide a link to the content in the first language to the second member, and receive qualitative and quantitative feedback including a suggested translation from the second member relating to the translation of the content;

a profile module configured to store a profile associated with the second member, the profile indicating the second language; and a storage medium configured to store the translated content.

11. The system recited in claim 10, wherein the content module is further configured to retrieve the content from a content source.

12. The system recited in claim 10, wherein the content comprises a post in a message board associated with the community.

13. The system recited in claim 10, wherein the content comprises a comment associated with the community.

14. The system recited in claim 10, wherein the interface module is further configured to display the content in the first language to the second member.

15. The system recited in claim 10, wherein the translation module is further configured based on statistical machine translation (SMT).

16. The system recited in claim 15, wherein the translation module is further configured to use the qualitative and quantitative feedback to train the SMT.

17. The system recited in claim 10, wherein the translation module is further configured based on translation memory (TM).

18. A non-transitory computer readable storage medium having embodied thereon a program, the program being executable by a processor for performing a method for hosting a community in multiple languages, the method comprising:

receiving a request from a first member of the community to post content in a first language within the community, the content including a text link in the first language;

translating the content, including the text link in the first language, into a second language;

receiving login information from a second member associated with the second language;

displaying the translated content to the second member;

providing a link to the content in the first language to the second member; and receiving qualitative and quantitative feedback from the second member relating to the translation of the content, the feedback including a suggested translation, wherein the second member is associated with the second language via a profile.

19. The non-transitory computer readable storage medium recited in claim 18, wherein the method further comprises retrieving the content from a content source.

20. The non-transitory computer readable storage medium recited in claim 18, wherein the content comprises a post in a message board associated with the community.

21. The non-transitory computer readable storage medium recited in claim 18, wherein the content comprises a comment associated with the community.

22. The non-transitory computer readable storage medium recited in claim 18, wherein the method further comprises displaying the content in the first language to the second member.

23. The non-transitory computer readable storage medium recited in claim 18, wherein translating the content is performed using a statistical machine translation (SMT) engine.

24. The non-transitory computer readable storage medium recited in claim 23, wherein the method further comprises training the SMT engine using the qualitative and quantitative feedback.

25. The non-transitory computer readable storage medium recited in claim 18, wherein translating the content is performed using a translation memory (TM) database.

* * * * *